US009052997B2

(12) United States Patent
Ono

(10) Patent No.: US 9,052,997 B2
(45) Date of Patent: Jun. 9, 2015

(54) VEHICLE BEHAVIOR PREDICTION APPARATUS AND VEHICLE BEHAVIOR PREDICTION METHOD

(71) Applicant: Sayaka Ono, Susono (JP)

(72) Inventor: Sayaka Ono, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 87 days.

(21) Appl. No.: 13/927,643

(22) Filed: Jun. 26, 2013

(65) Prior Publication Data

US 2014/0032090 A1  Jan. 30, 2014

(30) Foreign Application Priority Data

Jul. 27, 2012 (JP) ................. 2012-167641

(51) Int. Cl.
*G06F 17/00* (2006.01)
*G08G 1/16* (2006.01)
*G07C 5/00* (2006.01)

(52) U.S. Cl.
CPC *G06F 17/00* (2013.01); *G08G 1/16* (2013.01); *G07C 5/00* (2013.01); *G08G 1/163* (2013.01)

(58) Field of Classification Search
CPC .......... G06F 17/00; G08G 1/163; G08G 1/16; G07C 5/00
USPC ....................................................... 701/119
See application file for complete search history.

(56) References Cited

U.S. PATENT DOCUMENTS

| | | | |
|---|---|---|---|
| 8,818,680 B2 * | 8/2014 | Isaji et al. ........................ 701/96 |
| 2005/0267608 A1 * | 12/2005 | Nishira et al. ................... 700/44 |
| 2008/0120025 A1 * | 5/2008 | Naitou et al. .................. 701/207 |
| 2009/0037088 A1 * | 2/2009 | Taguchi ......................... 701/117 |
| 2010/0010699 A1 * | 1/2010 | Taguchi et al. .................. 701/23 |
| 2010/0036578 A1 * | 2/2010 | Taguchi et al. .................. 701/93 |
| 2010/0042282 A1 * | 2/2010 | Taguchi et al. .................. 701/25 |
| 2010/0076621 A1 | 3/2010 | Kubotani et al. |
| 2011/0080302 A1 * | 4/2011 | Muthaiah et al. ............. 340/903 |
| 2013/0080019 A1 * | 3/2013 | Isaji et al. ........................ 701/96 |

FOREIGN PATENT DOCUMENTS

JP  2010-92424  4/2010
WO  WO 2008/126389 A1  10/2008

* cited by examiner

*Primary Examiner* — Mary Cheung
*Assistant Examiner* — Frederick Brushaber
(74) *Attorney, Agent, or Firm* — Oblon, McClelland, Maier & Neustadt, L.L.P.

(57) ABSTRACT

A vehicle behavior prediction apparatus includes: a storage device that stores a plurality of pieces of behavior characteristic information associating a vehicle behavior with a characteristic of time series variation in travel condition information, the plurality of pieces of the behavior characteristic information being divided into a plurality of patterns corresponding to the different traffic conditions in a preceding location preceding a predetermined location; a selection unit that selects, as corresponding behavior characteristic information, the behavior characteristic information having a pattern corresponding to a current traffic condition from among the stored behavior characteristic information on the basis of the travel condition information obtained upon arrival of the vehicle in the preceding location; and a prediction unit that predicts the vehicle behavior in the predetermined location by comparing the corresponding behavior characteristic information with the time series variation in the currently obtained travel condition information.

13 Claims, 13 Drawing Sheets

VEHICLE BEHAVIOR PREDICTION APPARATUS AND VEHICLE BEHAVIOR PREDICTION METHOD

INCORPORATION BY REFERENCE

The disclosure of Japanese Patent Application No. 2012-167641 filed on Jul. 27, 2012 including the specification, drawings and abstract is incorporated herein by reference in its entirety.

BACKGROUND OF THE INVENTION

1. Field of the Invention

The invention relates to a vehicle behavior prediction apparatus and a vehicle behavior prediction method.

2. Description of Related Art

Vehicle behavior prediction techniques have been developed in the related art to predict vehicle behavior.

For example, Japanese Patent Application Publication No. 2010-92424 (JP 2010-92424 A) describes a driving assist apparatus that extrapolates vehicle behavior in a predetermined location by learning travel condition information for each situation and comparing learned data with current travel condition information. The travel condition information includes, for example, vehicle speed information, current position information, road information, accelerator depression amount information, steering angle information, and so on. Further, WO 2008/126389 describes a safe driving assist apparatus that creates a driving behavior prediction model based on statistical learning from time series data relating to driver operations such as a brake operation, an accelerator operation, a steering operation, and a blinker operation, and advancement directions of a host vehicle following the operations, and uses the created driving behavior prediction model to predict a vehicle path.

In the related art described above, however, a precision with which the vehicle behavior is predicted may deteriorate when a current traffic condition differs from a traffic condition expected from the learned data.

SUMMARY OF THE INVENTION

The invention provides a vehicle behavior prediction apparatus and a vehicle behavior prediction method with which a precision of vehicle behavior prediction can be improved.

A first aspect of the invention relates to a vehicle behavior prediction apparatus. The vehicle behavior prediction apparatus includes: a storage device that stores a plurality of pieces of behavior characteristic information that is information associating a vehicle behavior of a vehicle with a characteristic of time series variation in travel condition information, the plurality of pieces of the behavior characteristic information being divided into a plurality of patterns corresponding to the different traffic conditions in a preceding location preceding a predetermined location; an acquisition unit that obtains the travel condition information of the vehicle; a selection unit that selects, as corresponding behavior characteristic information, the behavior characteristic information having a pattern that corresponds to a current traffic condition from among the plurality of pieces of the behavior characteristic information stored in the storage device on the basis of the travel condition information obtained by the acquisition unit upon arrival of the vehicle in the preceding location; and a prediction unit that predicts the vehicle behavior of the vehicle in the predetermined location by comparing the corresponding behavior characteristic information selected by the selection unit with the time series variation in the travel condition information of the vehicle currently obtained by the acquisition unit.

A second aspect of the invention relates to a vehicle behavior prediction method. The vehicle behavior prediction method includes: storing a plurality of pieces of behavior characteristic information that is information associating a vehicle behavior of a vehicle with a characteristic of time series variation in travel condition information, in a storage device, the plurality of pieces of the behavior characteristic information being divided into a plurality of patterns corresponding to the different traffic conditions in a preceding location preceding a predetermined location; obtaining the travel condition information of the vehicle; selecting, as corresponding behavior characteristic information, the behavior characteristic information having a pattern that corresponds to a current traffic condition from among the plurality of pieces of the behavior characteristic information stored in the storage device on the basis of the travel condition information obtained upon arrival of the vehicle in the preceding location; and predicting the vehicle behavior of the vehicle in the predetermined location by comparing the selected corresponding behavior characteristic information with the time series variation in the currently obtained travel condition information of the vehicle.

According to the configurations described above, the precision of vehicle behavior prediction can be improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of a vehicle behavior prediction apparatus and a vehicle behavior prediction method according to the invention will be described in detail below on the basis of the drawings. Note that the invention is not limited by these embodiments. Further, constituent elements of the embodiments to be described below include elements that could be envisaged easily by a person skilled in the art or substantially identical elements.

[First Embodiment]

Figure 1:
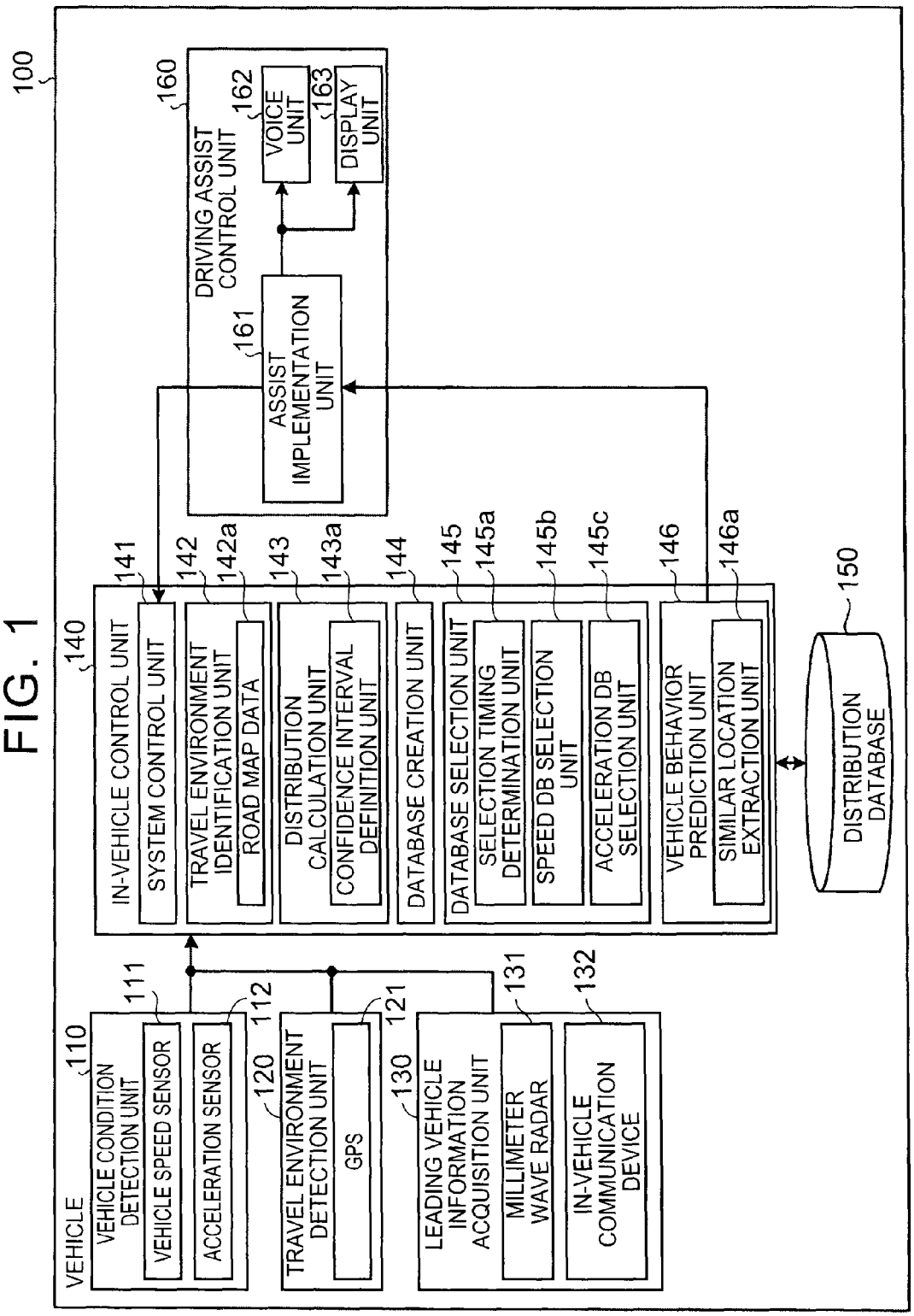
FIG. 1 is a block diagram showing an example of a configuration of a vehicle behavior prediction system according to a first embodiment.

A configuration of a vehicle behavior prediction system according to a first embodiment of the invention will now be described with reference to FIG. 1. FIG. 1 is a block diagram showing an example of the configuration of the vehicle behavior prediction system according to this embodiment.

As shown in FIG. 1, a vehicle 100 to which the vehicle behavior prediction system according to the first embodiment is applied includes a vehicle condition detection unit 110, a travel environment detection unit 120, a leading vehicle information acquisition unit 130, an in-vehicle control unit (ECU) 140, a distribution database 150, and a driving assist control unit 160.

The vehicle condition detection unit 110 detects a travel condition of a host vehicle. The vehicle condition detection unit 110 includes, for example, a vehicle speed sensor 111, an acceleration sensor 112, and so on. The vehicle speed sensor 111 detects a travel speed of the vehicle 100. The acceleration sensor 112 detects an acceleration of the vehicle 100. The vehicle speed sensor 111 and the acceleration sensor 112 are electrically connected to the in-vehicle control unit 140, in which detection results from various sensors and the like are aggregated, via an in-vehicle network such as a control area network (CAN), for example. The vehicle speed sensor 111 detects a vehicle wheel rotation speed and outputs a signal corresponding to the detected rotation speed to the in-vehicle control unit 140. The acceleration sensor 112 detects the acceleration of the vehicle 100 and outputs a signal corresponding to the detected acceleration to the in-vehicle control unit 140.

The travel environment detection unit 120 detects a travel position or a travel environment of the host vehicle or a leading vehicle. The travel environment detection unit 120 includes a GPS 121 and so on, for example. The GPS 121 receives a satellite signal, and detects an absolute position, or in other words a latitude/longitude, of the vehicle 100 or the leading vehicle on the basis of the received satellite signal. The GPS 121 detects the varying latitude/longitude of the vehicle 100 or the leading vehicle as the vehicle 100 or the leading vehicle moves, or in other words the latitude/longitude in each location through which the vehicle 100 or the leading vehicle travels, and outputs latitude/longitude information indicating a detection result to the in-vehicle control unit 140.

The leading vehicle information acquisition unit 130 obtains information indicating the travel condition and so on of the leading vehicle. The leading vehicle includes a plurality of vehicles traveling ahead of the vehicle 100 in an advancement direction, and not only a single vehicle traveling directly ahead of the vehicle 100. The leading vehicle information acquisition unit 130 includes a millimeter wave radar 131 and an in-vehicle communication device 132, for example. The millimeter wave radar 131 detects the existence of a leading vehicle using radio waves in a millimeter waveband. The in-vehicle communication device 132 performs vehicle-to-vehicle communication with a vehicle traveling on the periphery of the vehicle 100, or road-to-vehicle communication with a roadside communication device provided on a road. After detecting the existence of a leading vehicle, the millimeter wave radar 131 outputs a signal indicating a detection result to the in-vehicle control unit 140. The in-vehicle communication device 132 obtains information indicating the travel condition of the leading vehicle, such as the travel speed or the acceleration, by performing vehicle-to-vehicle communication with the leading vehicle, for example. The in-vehicle communication device 132 then outputs the obtained information to the in-vehicle control unit 140.

In this embodiment, the vehicle condition detection unit 110, the travel environment detection unit 120, and the leading vehicle information acquisition unit 130 together function as an acquisition unit. The acquisition unit obtains travel condition information relating to a vehicle (including the host vehicle and the leading vehicle).

The in-vehicle control unit 140 includes a system control unit 141, a travel environment identification unit 142, a distribution calculation unit 143, a database creation unit 144, a database selection unit 145, and a vehicle behavior prediction unit 146.

When detection results relating to respective driving operations are input into the system control unit 141 from the vehicle condition detection unit 110, the system control unit 141 controls various in-vehicle devices on the basis of the detection results. More specifically, the system control unit 141 controls various in-vehicle devices such as an engine, a brake, a blinker, and a steering wheel on the basis of the detection results obtained by the vehicle speed sensor 111 and the acceleration sensor 112, which are input from the vehicle condition detection unit 110, and detection results obtained by an accelerator sensor, a brake sensor, a steering angle sensor, and so on. Hence, when a driver depresses an accelerator pedal, for example, such that the detection result from the accelerator sensor or the like varies, an engine control amount is calculated in accordance with the detection result, whereupon the engine is controlled in accordance with a calculation result.

The travel environment identification unit 142 identifies a travel environment of the vehicle 100 or the leading vehicle on the basis of the latitude/longitude information relating to the vehicle 100 or the leading vehicle, which is input from the travel environment detection unit 120 or the leading vehicle information acquisition unit 130, and so on. When the latitude/longitude information is input into the travel environment identification unit 142 from the travel environment detection unit 120, the travel environment identification unit 142 outputs the input latitude/longitude information to the distribution calculation unit 143. The travel environment identification unit 142 includes road map data 142a, and road shapes, intersection shapes, road surface gradients, and so on are registered together with latitude/longitude information indicating positions thereof in advance in the road map data 142a. The travel environment identification unit 142 identifies the travel environment of the vehicle 100 or the leading vehicle by referring to the road map data 142*a* on the basis of the latitude/longitude information input from the travel environment detection unit 120. For example, the travel environment identification unit 142 identifies characteristics of a travel location through which the vehicle 100 or the leading vehicle is traveling. The travel environment identification unit 142 outputs an identification result to the distribution calculation unit 143. Elements affecting vehicle behavior, such as the intersection shape, the road shape, a road width, a number of lanes, a road curvature, the road surface gradient, the presence of an infrastructure device such as a traffic light, the presence of a traffic regulation such as a temporary stop position, and a speed limit, for example, correspond to the characteristics of the travel location. In this embodiment, the vehicle behavior includes, for example, deceleration behavior and non-deceleration behavior performed by the vehicle 100 or the leading vehicle.

The distribution calculation unit 143 calculates a probability distribution indicating occurrence probabilities of a vehicle behavior in a subject vehicle (a vehicle behavior prediction subject vehicle). More specifically, when information indicating the travel speed and the acceleration of the vehicle 100 or the leading vehicle is input into the distribution calculation unit 143 from the vehicle condition detection unit 110 or the leading vehicle information acquisition unit 130, the distribution calculation unit 143 associates position information indicating the latitude/longitude of the vehicle 100 or the leading vehicle at a detection time of the travel speed and the acceleration, or a relative position thereof among traffic elements, with the information indicating the travel speed and the acceleration. Hereafter in this specification, the travel speed and the acceleration will be referred to together as a cruising speed, and the information indicating the travel speed and the acceleration will be referred to as cruising speed information. When a number of acquisitions of the cruising speed information exceeds a predetermined number, the distribution calculation unit 143 creates a vehicle behavior probability distribution on the basis of the cruising speed information. In this embodiment, the number of acquisitions of the cruising speed information required to create the probability distribution is defined as approximately "twenty acquisitions" in an identical location or a location having a similar travel environment, for example. The distribution calculation unit 143 creates the vehicle behavior probability distribution for each travel location and each travel environment. Note that the distribution calculation unit 143 divides the vehicle behavior probability distributions into the respective travel locations on the basis of the latitude/longitude. Further, the travel environment is identified by the travel environment identification unit 142. The distribution calculation unit 143 creates a probability distribution of the travel speed (a travel speed probability distribution) and a probability distribution of the acceleration (an acceleration probability distribution) in travel locations or travel environments such as intersections and curves, i.e. locations where transitions (time series variation) in the travel speed or transitions (time series variation) in the acceleration can be divided into a plurality of patterns. After creating the travel speed probability distributions and the acceleration probability distributions, the distribution calculation unit 143 outputs data indicating the created probability distributions to the database creation unit 144 as appropriate. The distribution calculation unit 143 includes a confidence interval definition unit 143*a* that defines confidence intervals in the created probability distributions. The confidence interval definition unit 143*a* defines an interval of the probability distribution having a confidence level of approximately 95% (a 95% confidence interval), for example, as a confidence interval.

When data are input into the database creation unit 144 from the distribution calculation unit 143, the database creation unit 144 divides a plurality of behavior characteristic information into a plurality of patterns corresponding to different traffic conditions in a preceding location preceding a predetermined location on the basis of the input data, and registers the plurality of behavior characteristic information in the distribution database 150. The behavior characteristic information is information associating a vehicle behavior of a subject vehicle (deceleration behavior, non-deceleration behavior, and so on, for example) with a characteristic of the time series variation in the travel condition information (the travel speed, the acceleration, and so on, for example). The characteristic of the time series variation in the travel condition information is an average value or a confidence interval of the probability distribution, for example. In this embodiment, the database creation unit 144 may register the plurality of patterns of behavior characteristic information in the distribution database 150, or register a plurality of vehicle behavior databases (referred to hereafter as DBI, DBII, DBIII) respectively storing different behavior characteristic information in the distribution database 150. Further, the traffic condition may be the cruising speed of the vehicle in the preceding location or the road surface gradient in the preceding location, for example. Thus, the behavior characteristic information is accumulated in the distribution database 150 for each traffic condition in which the vehicle 100 or the leading vehicle travels.

The database selection unit 145 includes a selection timing determination unit 145*a*, a speed DB selection unit 145*b*, and an acceleration DB selection unit 145*c*. In this embodiment, the selection timing determination unit 145*a*, speed DB selection unit 145*b*, and acceleration DB selection unit 145*c* of the database selection unit 145 together function as a selection unit. The selection unit selects corresponding behavior characteristic information having a pattern that corresponds to a current traffic condition from among the plurality of pieces of behavior characteristic information stored in the database 150, which serves as a storage device, on the basis of the travel condition information obtained by the acquisition unit upon arrival of the vehicle in the preceding location. In this embodiment, when a plurality of vehicle behavior databases respectively storing different behavior characteristic information are registered in the distribution database 150, the selection unit may select the vehicle behavior database (DBI, DBII, DBIII, or the like, for example) storing the corresponding behavior characteristic information having the pattern that corresponds to the current traffic condition from the distribution database 150 on the basis of the travel condition information obtained by the acquisition unit upon arrival of the vehicle in the preceding location.

The selection timing determination unit 145*a* determines a timing at which the appropriate behavior characteristic information is selected in accordance with the characteristic indicated by the plurality of pieces of behavior characteristic information stored in the distribution database 150. In this embodiment, for example, the selection timing determination unit 145*a* determines a location in which a difference in an average value of the cruising speed appears among the plurality of pieces of behavior characteristic information stored in the distribution database 150 as a selection location. Note that when a plurality of vehicle behavior databases are registered in the distribution database 150, the selection timing determination unit 145*a* may determine the timing at which the appropriate behavior characteristic information is selected in accordance with the characteristic indicated by the behavior characteristic information stored respectively in the plurality of vehicle behavior databases. Processing performed by the selection timing determination unit 145a will be described in detail below.

The speed DB selection unit 145b selects appropriate travel speed behavior characteristic information from among a plurality of pieces of behavior characteristic information (travel speed behavior characteristic information) relating to the travel speed, which are stored in the distribution database 150, on the basis of the vehicle behavior of the subject vehicle. In this embodiment, for example, the speed DB selection unit 145b calculates an average value of the travel speed of the vehicle in the preceding location on the basis of the travel condition information obtained by the acquisition unit upon arrival of the subject vehicle in the preceding location. Meanwhile, average travel speed values are associated respectively with the plurality of pieces of behavior characteristic information stored in the distribution database 150, and the speed DB selection unit 145b selects the corresponding behavior characteristic information having the pattern that corresponds to the current traffic condition by determining the average travel speed value, from among the plurality of average travel speed values associated respectively with the plurality of pieces of behavior characteristic information, to which the calculated average travel speed value corresponds. Here, when a selection location has been determined by the selection timing determination unit 145a, the speed DB selection unit 145b may calculate the average travel speed value of the vehicle in the selection location on the basis of the travel condition information obtained by the acquisition unit upon arrival of the subject vehicle in the selection location. In this case, the speed DB selection unit 145b selects the corresponding behavior characteristic information having the pattern that corresponds to the current traffic condition by determining the average travel speed value, from among the plurality of average travel speed values associated respectively with the plurality of pieces of behavior characteristic information, to which the average travel speed value calculated in the selection location corresponds. Note that when a plurality of vehicle behavior databases (referred to hereafter as speed DBs) respectively storing travel speed behavior characteristic information are registered in the distribution database 150, the speed DB selection unit 145b may select the speed DB storing the appropriate travel speed behavior characteristic information from among the plurality of speed DBs on the basis of the vehicle behavior of the subject vehicle. Processing performed by the speed DB selection unit 145b will be described in detail below.

The acceleration DB selection unit 145c selects appropriate acceleration behavior characteristic information from among a plurality of pieces of behavior characteristic information (acceleration behavior characteristic information) relating to the acceleration, which are stored in the distribution database 150, on the basis of the vehicle behavior of the subject vehicle. In this embodiment, for example, the acceleration DB selection unit 145c calculates an average value of the acceleration of the vehicle in the preceding location on the basis of the travel condition information obtained by the acquisition unit upon arrival of the subject vehicle in the preceding location. Meanwhile, average acceleration values are associated respectively with the plurality of pieces of behavior characteristic information stored in the distribution database 150, and the acceleration DB selection unit 145c selects the corresponding behavior characteristic information having the pattern that corresponds to the current traffic condition from the distribution database 150 by determining the average acceleration value, from among the plurality of average acceleration values associated respectively with the plurality of pieces of behavior characteristic information, to which the calculated average acceleration value corresponds. Here, when a selection location has been determined by the selection timing determination unit 145a, the acceleration DB selection unit 145c may calculate the average acceleration value of the vehicle in the selection location on the basis of the travel condition information obtained by the acquisition unit upon arrival of the subject vehicle in the selection location. In this case, the acceleration DB selection unit 145c selects the corresponding behavior characteristic information having the pattern that corresponds to the current traffic condition by determining the average acceleration value, from among the plurality of average acceleration values associated respectively with the plurality of pieces of behavior characteristic information, to which the average acceleration value calculated in the selection location corresponds.

The acceleration DB selection unit 145c also selects the appropriate acceleration behavior characteristic information from among the plurality of pieces of acceleration behavior characteristic information stored in the distribution database 150 in accordance with the characteristic of the interval in which the subject vehicle is traveling. In this embodiment, for example, the acceleration DB selection unit 145c obtains the road surface gradient in the preceding location on the basis of the travel condition information obtained by the acquisition unit upon arrival of the subject vehicle in the preceding location. Meanwhile, road surface gradients are associated respectively with the plurality of pieces of behavior characteristic information stored in the distribution database 150, and the acceleration DB selection unit 145c selects the corresponding behavior characteristic information corresponding to the current traffic condition by determining the road surface gradient, from among the plurality of road surface gradients associated respectively with the plurality of pieces of behavior characteristic information, to which the obtained road surface gradient corresponds. Note that when a plurality of vehicle behavior databases (referred to hereafter as acceleration DBs) respectively storing acceleration behavior characteristic information are registered in the distribution database 150, the acceleration DB selection unit 145c may select the acceleration DB storing the appropriate acceleration behavior characteristic information from among the plurality of acceleration DBs on the basis of the vehicle behavior of the subject vehicle. Processing performed by the acceleration DB selection unit 145c will be described in detail below.

The vehicle behavior prediction unit 146 predicts the vehicle behavior of the vehicle in the predetermined location by comparing the behavior characteristic information selected by the selection unit with the time series variation in the travel condition information of the vehicle currently obtained by the acquisition unit.

For example, when the vehicle behavior prediction unit 146 recognizes the existence of a leading vehicle in front of the vehicle 100 in the advancement direction on the basis of information input from the leading vehicle information acquisition unit 130, the vehicle behavior prediction unit 146 predicts the vehicle behavior of the leading vehicle. To predict the vehicle behavior, the vehicle behavior prediction unit 146 obtains information indicating the travel speed and the acceleration of the leading vehicle from the leading vehicle information acquisition unit 130. The vehicle behavior prediction unit 146 then identifies the travel location of the leading vehicle on the basis of the latitude/longitude information of the vehicle 100, obtained by the GPS 121, and the detection result obtained by the millimeter wave radar 131. On the basis of the identified travel location of the leading vehicle, the vehicle behavior prediction unit 146 extracts the travel speed probability distribution and the acceleration probability distribution created in a location having a shared latitude/longitude from the distribution database 150. In other words, the vehicle behavior prediction unit 146 extracts the behavior characteristic information selected by the database selection unit 145. Next, the vehicle behavior prediction unit 146 predicts the vehicle behavior of the leading vehicle on the basis of a relationship of the travel speed and acceleration of the leading vehicle to the extracted travel speed probability distribution and acceleration probability distribution. The vehicle behavior prediction unit 146 predicts the occurrence of deceleration behavior, for example, as the vehicle behavior of the leading vehicle. When the vehicle behavior prediction unit 146 cannot determine whether or not deceleration behavior will occur in the leading vehicle with a high degree of probability, the occurrence of deceleration behavior in the leading vehicle is determined to be uncertain.

Further, the vehicle behavior prediction unit 146 includes a similar location extraction unit 146a. The similar location extraction unit 146a extracts a probability distribution created under a similar environment to the travel environment of the prediction subject leading vehicle from the distribution database 150. When a probability distribution created in a location having a shared latitude/longitude does not exist in the distribution database 150, the similar location extraction unit 146a extracts a probability distribution created under a travel environment having a similar road surface gradient, intersection shape, road shape, road curvature, and so on from the distribution database 150. In other words, at this time, the similar location extraction unit 146a extracts the behavior characteristic information selected by the database selection unit 145. In this embodiment, this extracted probability distribution is likewise used to predict the vehicle behavior of the leading vehicle. Hence, in this embodiment, vehicle behavior prediction can also be performed on a leading vehicle traveling in a travel location that has not yet been registered in the distribution database 150. Having predicted the vehicle behavior of the leading vehicle, the vehicle behavior prediction unit 146 outputs a prediction result to the driving assist control unit 160, which performs various types of driving assist on the basis of the prediction result.

The driving assist control unit 160 performs control relating to various types of driving assist on the basis of the prediction result obtained by the vehicle behavior prediction unit 146. The driving assist control unit 160 includes a assist implementation unit 161, a voice unit 162, and a display unit 163.

When the prediction result of the vehicle behavior of the leading vehicle is input into the assist implementation unit 161 from the vehicle behavior prediction unit 146, the assist implementation unit 161 determines control amounts of various control devices controlled by the system control unit 141 described above, for example, on the basis of the prediction result, and outputs the determined control amounts to the system control unit 141. Hence, when the prediction result from the vehicle behavior prediction unit 146 indicates deceleration behavior in the leading vehicle, for example, the engine is switched OFF or the brake is switched ON at or before a deceleration timing of the leading vehicle. When the vehicle 100 is a hybrid vehicle, the assist implementation unit 161 executes regenerative braking at or before the deceleration timing of the leading vehicle. For example, the assist implementation unit 161 generates voice data or image data for providing voice guidance or image guidance indicating that deceleration behavior is about to occur in the leading vehicle, and outputs the generated voice data or image data to the voice unit 162 and the display unit 163 at or before the deceleration timing of the leading vehicle. As a result, the driver of the vehicle 100 is provided with guidance encouraging him/her to decelerate the vehicle 100 via the voice unit 162 and the display unit 163 either when the leading vehicle decelerates or before the leading vehicle starts to decelerate.

When, on the other hand, the prediction result obtained by the vehicle behavior prediction unit 146 indicates that deceleration behavior will not occur in the leading vehicle, or in other words that the vehicle behavior of the leading vehicle is non-deceleration behavior, the assist implementation unit 161 does not execute deceleration assist via the system control unit 141, the voice unit 162, and the display unit 163. The assist implementation unit 161 may at this time notify the driver that deceleration behavior is not about to occur in the leading vehicle via the voice unit 162 and the display unit 163, for example. Similarly, the assist implementation unit 161 does not execute deceleration assist via the system control unit 141, the voice unit 162, and the display unit 163 when a prediction result indicating that the vehicle behavior of the leading vehicle is uncertain is input from the vehicle behavior prediction unit 146.

Figure 2A:
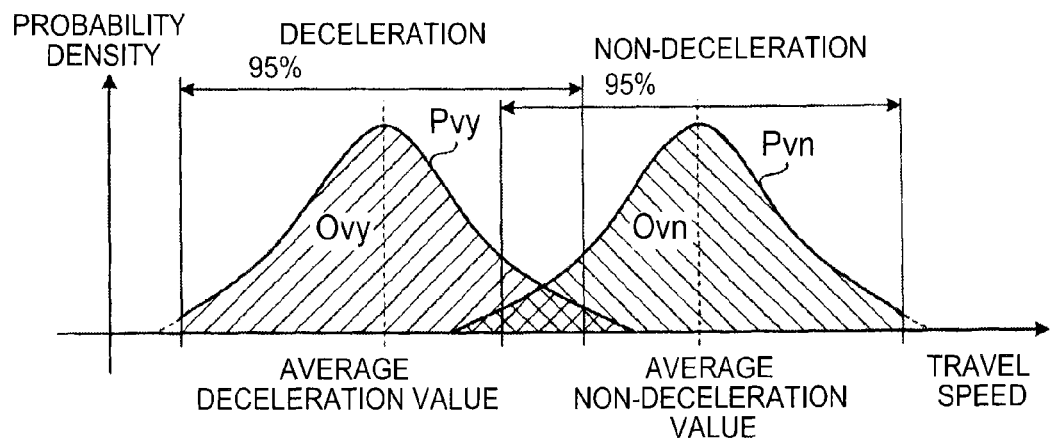
FIG. 2A is a graph showing an example of a probability distribution of a travel speed in a location removed from an intersection by a predetermined distance.
Figure 2B:
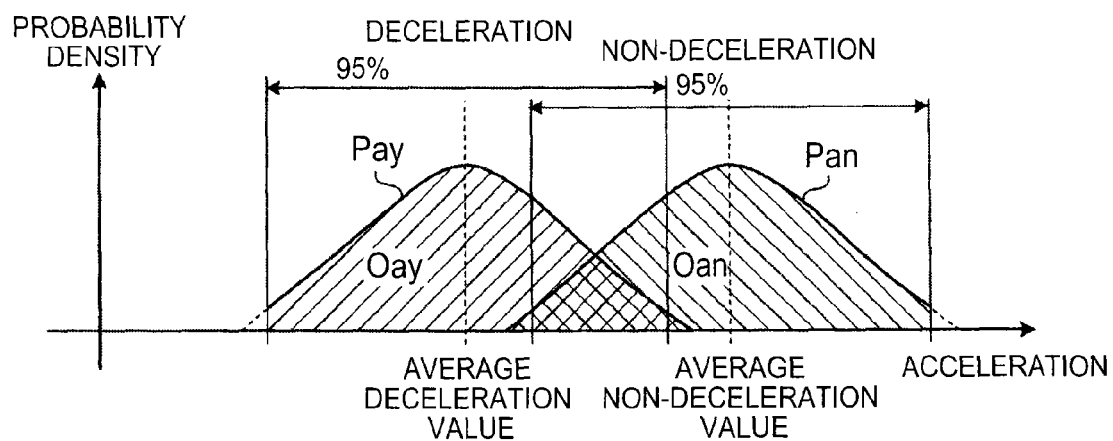
FIG. 2B is a graph showing an example of a probability distribution of an acceleration in the location removed from the intersection by the predetermined distance.
Figure 3:
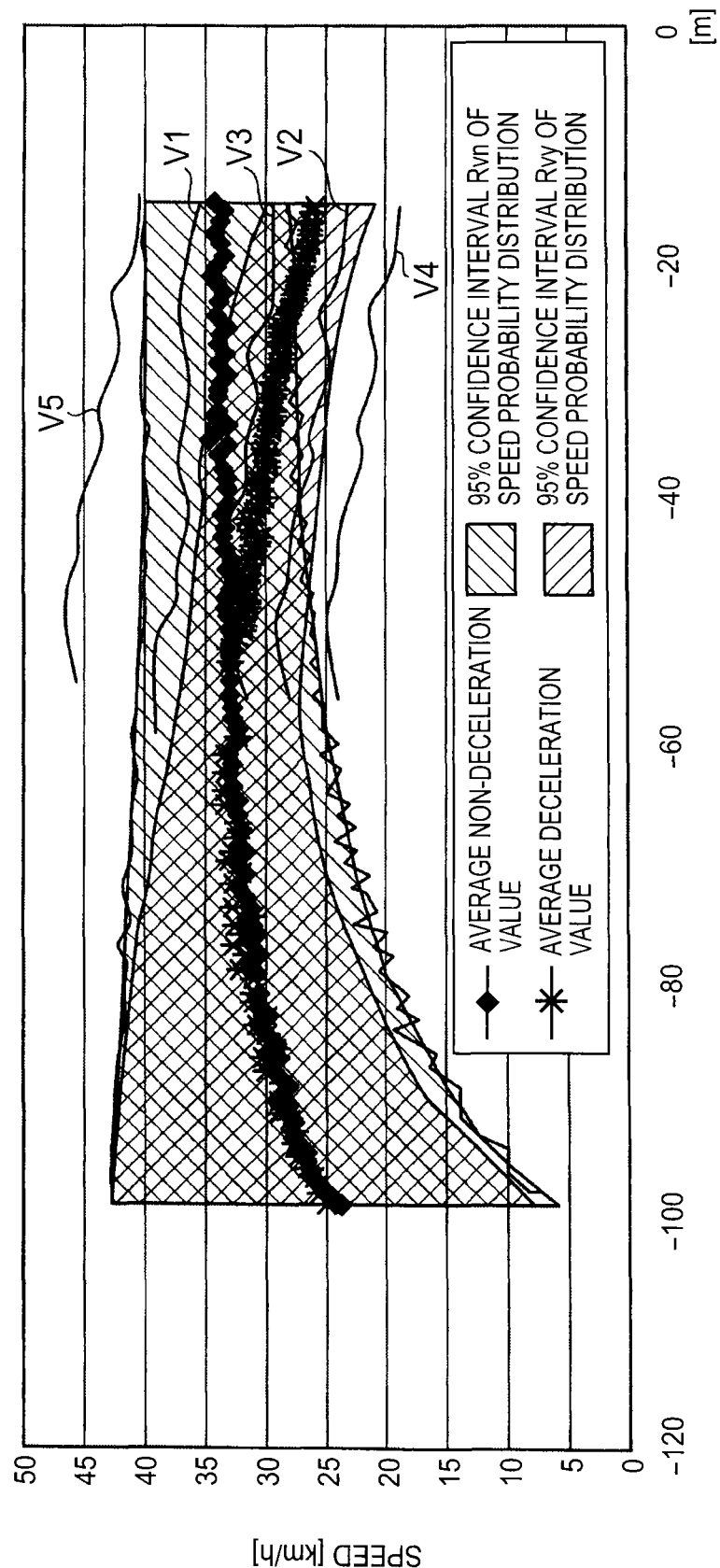
FIG. 3 is a graph showing an example of the probability distribution of the travel speed in a predetermined travel interval preceding the intersection.
Figure 4:
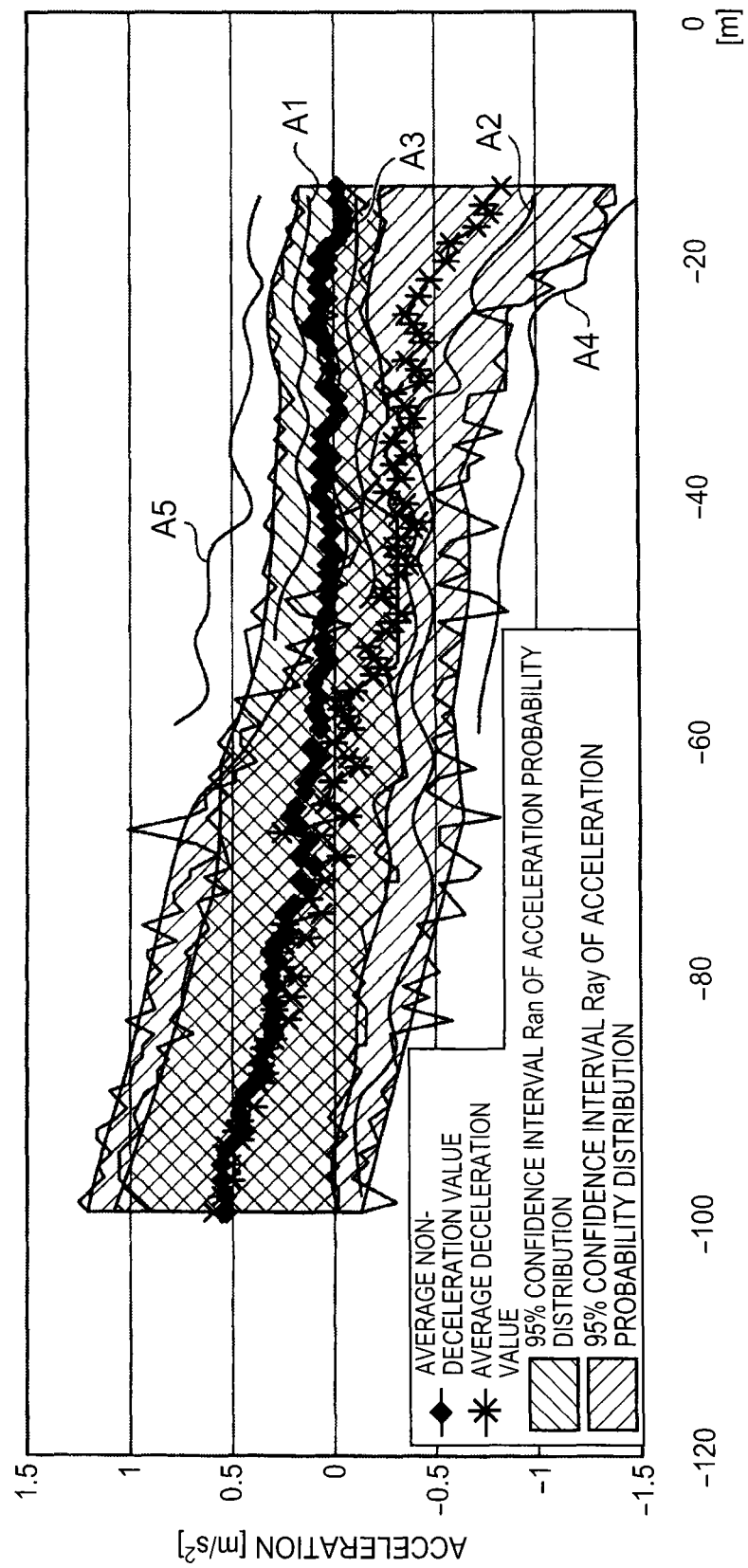
FIG. 4 is a graph showing an example of the probability distribution of the acceleration in the predetermined travel interval preceding the intersection.

Principles of vehicle behavior prediction according to this embodiment will now be described with reference to FIGS. 2A to 4. FIG. 2A shows the travel speed probability distribution in a location approximately "40 m" before an intersection provided with a traffic light. FIG. 2B shows the acceleration probability distribution in the location approximately "40 m" before the intersection provided with the traffic light. FIG. 3 shows behavior characteristic information indicating the travel speed probability distribution of a vehicle traveling through the intersection. Here, the travel speed probability distribution is indicated at intervals of approximately "1 m". In FIG. 3, a distribution Rvy and a distribution Rvn respectively indicate the 95% confidence interval of a travel speed probability distribution extending from a location approximately "100 m" before the intersection to the intersection. Further, the distribution Rvy shows the travel speed probability distribution when deceleration behavior occurs, while the distribution Rvn shows the travel speed probability distribution when deceleration behavior does not occur. FIG. 4 shows behavior characteristic information indicating the acceleration probability distribution of a vehicle traveling through the intersection. Here, the acceleration probability distribution is indicated at intervals of approximately "1 m". In FIG. 4, a distribution Ray and a distribution Ran respectively indicate the 95% confidence interval of an acceleration probability distribution extending from the location approximately "100 m" before the intersection to the intersection. Further, the distribution Ray indicates the acceleration probability distribution when deceleration behavior occurs, while the distribution Ran indicates the acceleration probability distribution when deceleration behavior does not occur.

As shown in FIG. 2A, for example, the travel speed probability distribution in the location approximately "40 m" before the intersection is divided into a distribution Pvy generated when deceleration behavior is performed due to an illuminated red light on the traffic light at the intersection or the like and a distribution Pvn generated when deceleration behavior is not performed at the intersection. In this embodiment, a distribution Ovy and a distribution Ovn are respectively defined as the 95% confidence intervals of the distribution Pvy and the distribution Pvn.

As shown in FIG. 2B, for example, the acceleration probability distribution in the location approximately "40 m" before the intersection is divided into a distribution Pay generated when deceleration behavior is performed due to an illuminated red light on the traffic light at the intersection or the like and a distribution Pan generated when deceleration behavior is not performed at the intersection. In this embodiment, a distribution Oay and a distribution Oan are respectively defined as the 95% confidence intervals of the distribution Pay and the distribution Pan.

As shown in FIG. 3, the 95% confidence interval of the travel speed probability distribution extending from the location positioned a predetermined distance before the intersection to the intersection is divided into the deceleration distribution Rvy generated when deceleration behavior is performed and the non-deceleration distribution Rvn generated when deceleration behavior is not performed. The deceleration distribution Rvy and the non-deceleration distribution Rvn are identical in the location approximately "100 m" before the intersection, but show different transitions (i.e. time series variation) closer to the intersection, for example. The reason for this is that when a deceleration operation is performed, the travel speed of the vehicle approaches "0" as the vehicle moves closer to the intersection.

For example, when a transition V1 of the travel speed (i.e., time series variation in the travel speed) of the subject vehicle is included in the non-deceleration distribution Rvn (included in a distribution range of the non-deceleration distribution) but not included in the deceleration distribution Rvy, it can be predicted that deceleration behavior will not occur in the subject vehicle. Further, when a transition V2 of the travel speed of the subject vehicle is included in the deceleration distribution Rvy but not included in the non-deceleration distribution Rvn, it can be predicted that deceleration behavior will occur in the subject vehicle. Furthermore, when a transition V3 of the travel speed of the subject vehicle is included in both the deceleration distribution Rvy and the non-deceleration distribution Rvn, deceleration behavior may or may not occur in the subject vehicle, and therefore the subsequent vehicle behavior is determined to be uncertain. Similarly, when transitions V4, V5 of the travel speed of the subject vehicle are not included in either the deceleration distribution Rvy or the non-deceleration distribution Rvn, the subsequent vehicle behavior is determined to be uncertain.

As shown in FIG. 4, the 95% confidence interval of the acceleration probability distribution extending from the location positioned a predetermined distance before the intersection to the intersection is divided into the deceleration distribution Ray generated when deceleration behavior is performed and the non-deceleration distribution Ran generated when deceleration behavior is not performed. In the location approximately "100 m" before the intersection, for example, a degree of overlap between the deceleration distribution Ray and the non-deceleration distribution Ran relating to the acceleration is smaller than a degree of overlap between the deceleration distribution Rvy and the non-deceleration distribution Rvn relating to the travel speed. The reason for this is that the acceleration is a differential value of the travel speed, and therefore variation in the acceleration accompanying a deceleration operation occurs immediately after the start of the deceleration operation.

For example, when a transition A1 (i.e., time series variation) of the acceleration of the subject vehicle is included in the non-deceleration distribution Ran but not included in the deceleration distribution Ray, it can be predicted that deceleration behavior will not occur in the subject vehicle. Further, when a transition A2 of the acceleration of the subject vehicle is included in the deceleration distribution Ray but not included in the non-deceleration distribution Ran, it can be predicted that deceleration behavior will occur in the subject vehicle. Furthermore, when a transition A3 of the acceleration of the subject vehicle is included in both the deceleration distribution Ray and the non-deceleration distribution Ran, deceleration behavior may or may not occur in the subject vehicle, and therefore the subsequent vehicle behavior is determined to be uncertain. Similarly, when transitions A4, A5 of the acceleration of the subject vehicle are not included in either the deceleration distribution Ray or the non-deceleration distribution Ran, the subsequent vehicle behavior is determined to be uncertain.

Figure 5:
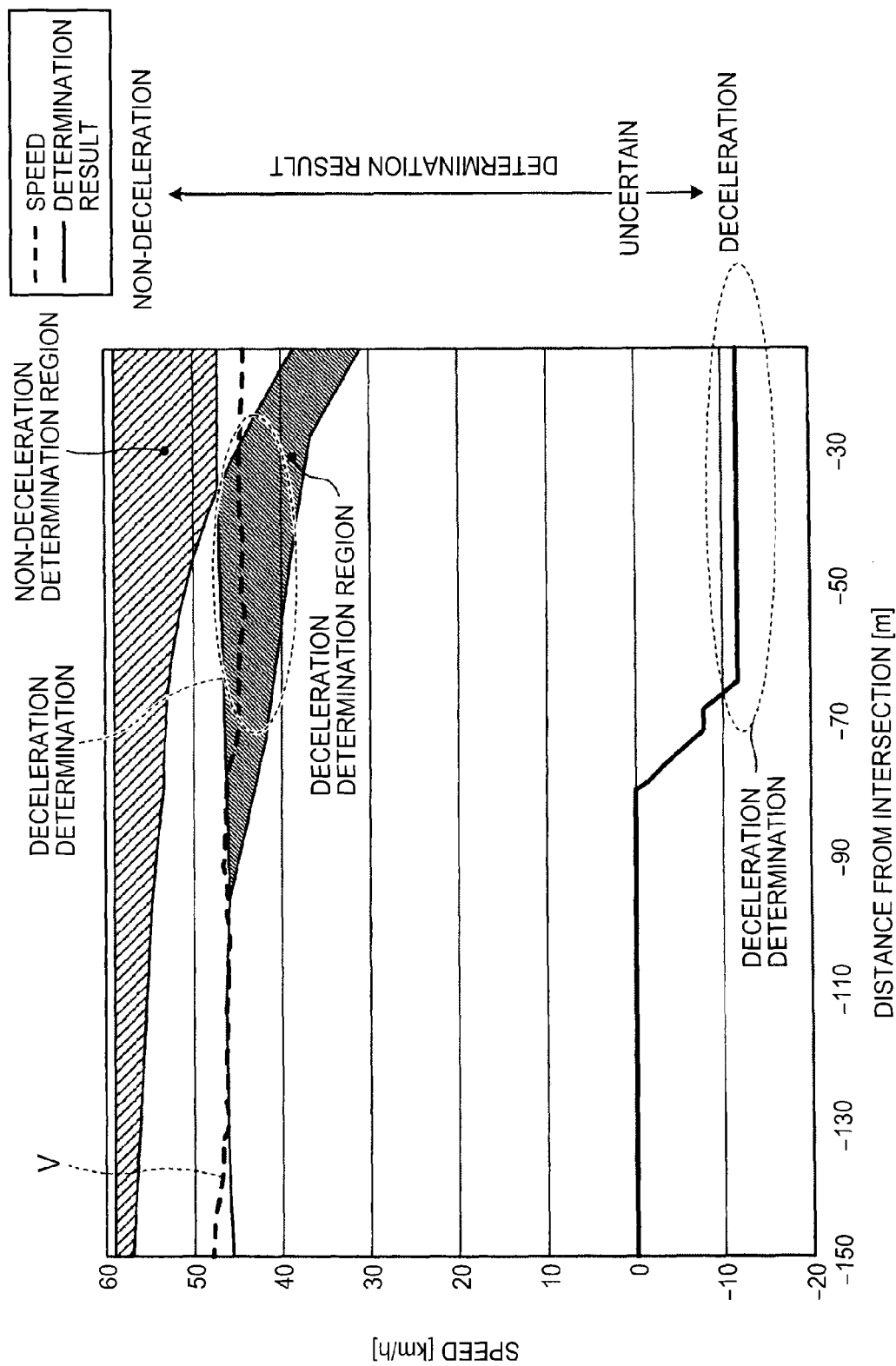
FIG. 5 is a graph showing an example in which deceleration behavior is predicted using behavior characteristic information for a case in which the travel speed is high.
Figure 6:
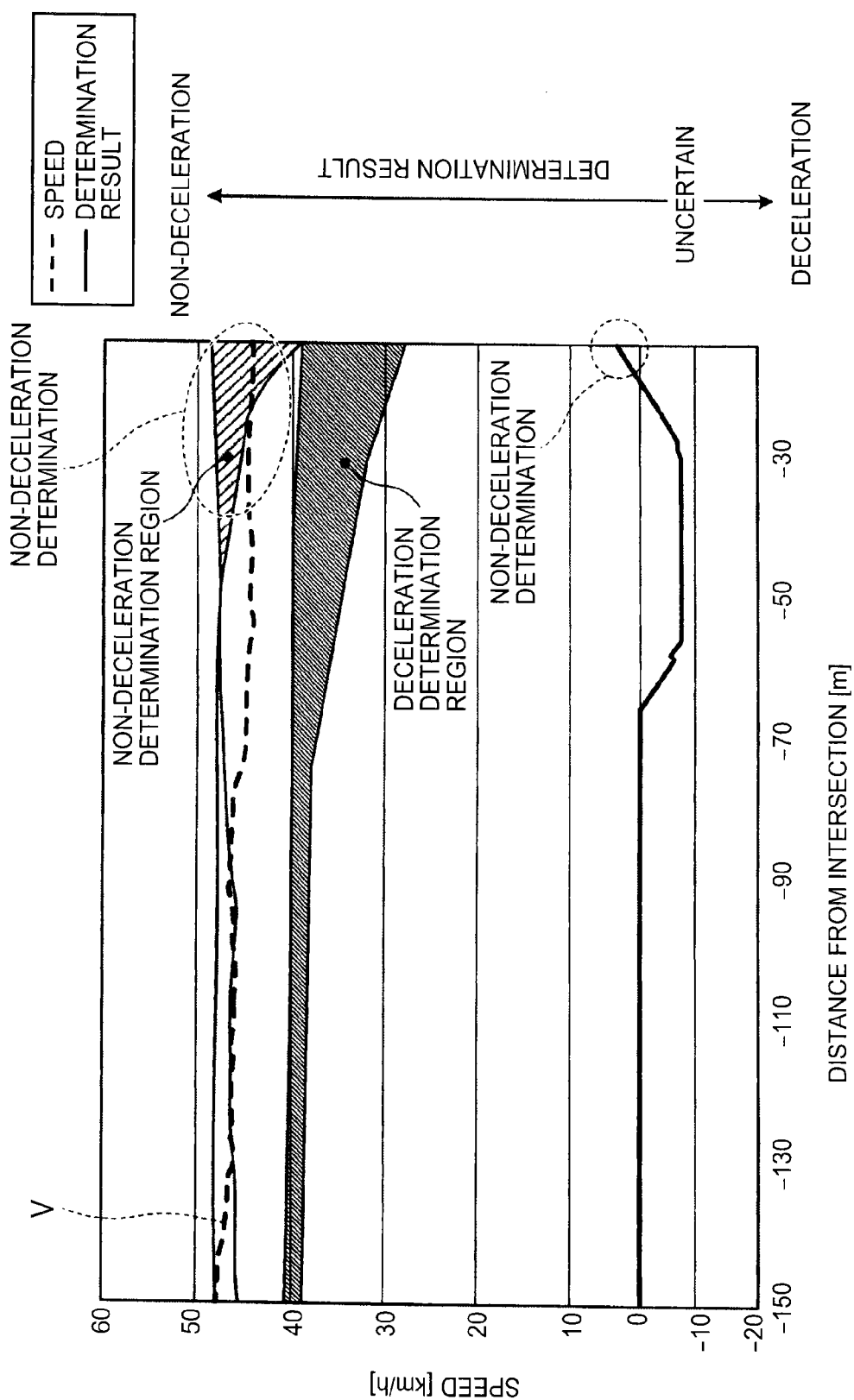
FIG. 6 is a graph showing an example in which non-deceleration behavior is predicted using behavior characteristic information for a case in which the travel speed is low.

To predict the vehicle behavior of the subject vehicle in this embodiment, therefore, the vehicle behavior prediction unit 146 predicts the vehicle behavior of the vehicle in the predetermined location by comparing the behavior characteristic information stored in the distribution database 150 with the time series variation in the travel condition information of the vehicle currently obtained by the acquisition unit. Upon prediction of the vehicle behavior, however, when the traffic condition (the cruising speed or the like, for example) expected from the behavior characteristic information stored in the distribution database 150 differs from the current traffic condition, a precision with which the vehicle behavior is predicted may deteriorate. As illustrated below using FIGS. 5 and 6, for example, the vehicle behavior prediction result may differ depending on the travel speed. FIG. 5 is a graph showing an example in which deceleration behavior is predicted using behavior characteristic information for a case in which the travel speed is high. FIG. 6 is a graph showing an example in which non-deceleration behavior is predicted using behavior characteristic information for a case in which the travel speed is low.

In the case shown in FIG. 5, the vehicle behavior prediction unit 146 compares the behavior characteristic information for a case in which the travel speed is high with the time series variation in the current travel condition information of the vehicle (a travel speed transition V in FIG. 5). As shown in FIG. 5, the travel speed transition V overlaps a deceleration determination region of the behavior characteristic information in the vicinity of the intersection, and therefore the vehicle behavior prediction unit 146 predicts deceleration behavior as the vehicle behavior of the vehicle in the predetermined location.

In the case shown in FIG. 6, on the other hand, the vehicle behavior prediction unit 146 compares the behavior characteristic information for a case in which the travel speed is low with the time series variation in the current travel condition information of the vehicle (a travel speed transition V in FIG. 6). As shown in FIG. 6, the travel speed transition V overlaps a non-deceleration determination region of the behavior characteristic information in the vicinity of the intersection, and therefore the vehicle behavior prediction unit 146 predicts non-deceleration behavior as the vehicle behavior of the vehicle in the predetermined location.

Hence, in this embodiment, the database selection unit 145 selects appropriate behavior characteristic information in which the current traffic condition matches the traffic condition expected from the behavior characteristic information stored in the distribution database 150 before the vehicle behavior of the subject vehicle is predicted by the vehicle behavior prediction unit 146. An example of vehicle behavior prediction processing according to the first embodiment will now be described with reference to FIG. 7. In the example shown in FIG. 7, a case in which a plurality of vehicle behavior databases (DBI, DBII, DBIII in FIG. 7) respectively storing different behavior characteristic information are registered in the distribution database 150 is envisaged.

Figure 7:
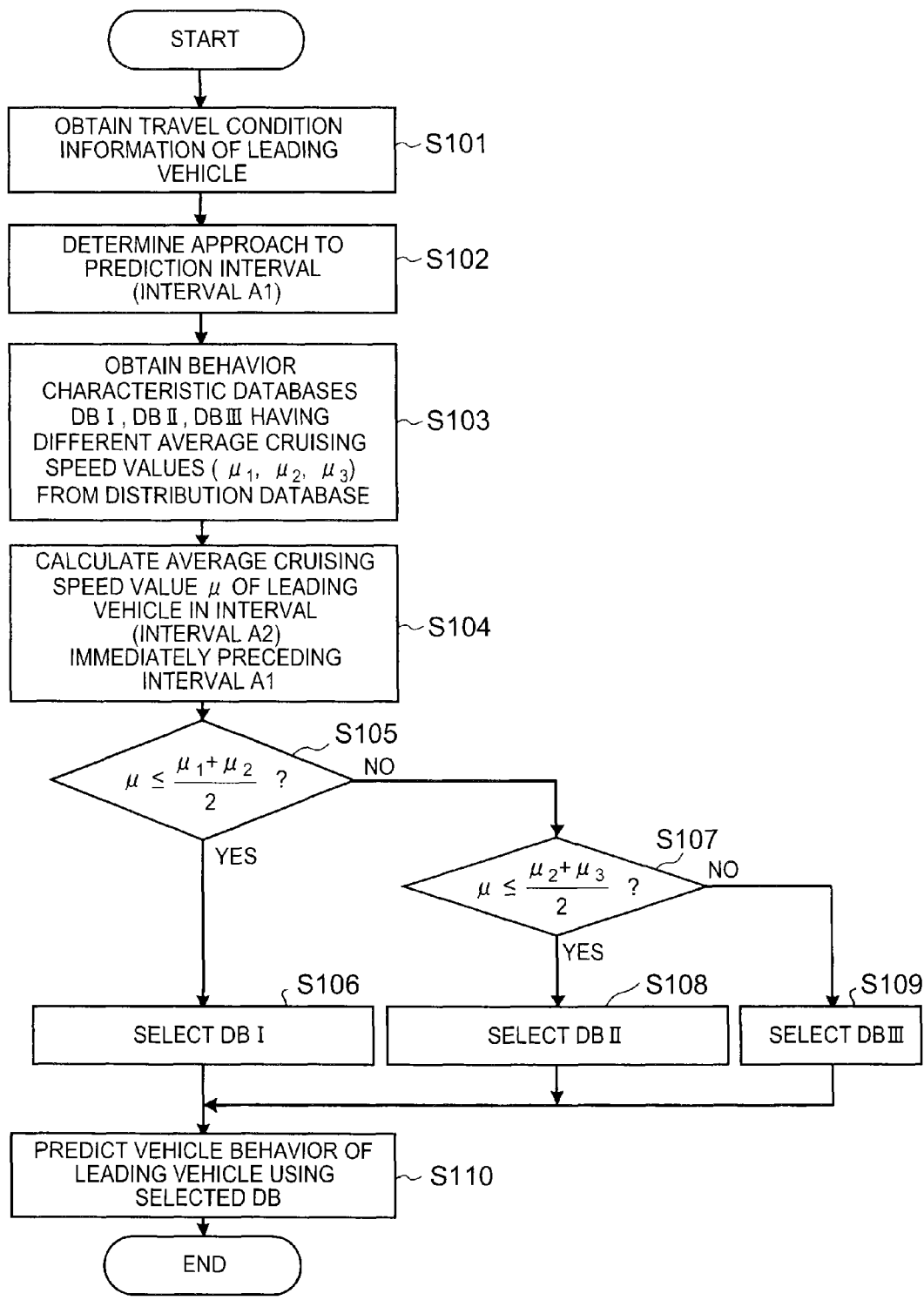
FIG. 7 is a flowchart showing an example of vehicle behavior prediction processing according to the first embodiment.

As shown in FIG. 7, the acquisition unit including the travel environment detection unit 120, the leading vehicle information acquisition unit 130, and so on obtains the travel condition information relating to the leading vehicle (step S101).

Next, on the basis of the latitude/longitude information and so on of the leading vehicle included in the travel condition information of the leading vehicle, the travel environment identification unit 142 determines that the leading vehicle has approached a prediction interval (a prediction location; referred to hereafter as an interval A1) in which the vehicle behavior of the vehicle 100 can be predicted (step S102). The interval A1 is set in the vicinity of a predetermined location such as an intersection.

After the approach of the leading vehicle to the interval A1 has been determined, the database selection unit 145 obtains the plurality of vehicle behavior databases DBI, DBII, DBIII storing behavior characteristic information including approximately identical cruising speeds to the cruising speed of the leading vehicle but respectively different average cruising speed values from the distribution database 150 (step S103). In this embodiment, the average cruising speed values (average travel speed values, for example) in the vehicle behavior databases DBI, DBII, DBIII obtained in step S103 are denoted by $\mu_1$, $\mu_2$, $\mu_3$. A magnitude relationship between these average cruising speed values is set at $\mu_1 < \mu_2 < \mu_3$.

On the basis of the travel condition information of the leading vehicle, the database selection unit 145 calculates an average cruising speed value (an average travel speed value, for example) $\mu$ of the leading vehicle in an interval (referred to hereafter as an interval A2) immediately before the leading vehicle enters the interval A1 (step S104). The interval A2 is set in the vicinity of a preceding location preceding the predetermined location such as an intersection.

On the basis of the average cruising speed value $\mu$ of the leading vehicle in the interval A2, the database selection unit 145 determines whether or not a following Formula 1 is established (step S105).

$$\mu \leq \frac{\mu_1 + \mu_2}{2} \quad \text{Formula 1}$$

When it is determined that Formula 1 is established (step S105: Yes), the database selection unit 145 determines that the average cruising speed value $\mu$ of the leading vehicle in the interval A2 corresponds to the average cruising speed value p in the vehicle behavior database DBI, and therefore selects the vehicle behavior database DBI as the database to be used by the vehicle behavior prediction unit 146 (step S106). The processing then advances to step S110.

When the database selection unit 145 determines that Formula 1 is not established (step S105: No), on the other hand, the cruising speed $\mu$ of the leading vehicle in the interval A2 may correspond to the average cruising speed value $\mu_2$ or $\mu_3$ in the vehicle behavior database DBII or DBIII. Therefore, the database selection unit 145 determines, on the basis of the average cruising speed value $\mu$ of the leading vehicle in the interval A2, whether or not a following Formula 2 is established (step S107).

$$\mu \leq \frac{\mu_2 + \mu_3}{2} \quad \text{Formula 2}$$

When it is determined that Formula 2 is established (step S107: Yes), the database selection unit 145 determines that the average cruising speed value u of the leading vehicle in the interval A2 corresponds to the average cruising speed value $\mu$ in the vehicle behavior database DBII, and therefore selects the vehicle behavior database DBII as the database to be used by the vehicle behavior prediction unit 146 (step S108). The processing then advances to step S110.

When it is determined that Formula 2 is not established (step S107: No), on the other hand, the database selection unit 145 determines that the average cruising speed value $\mu$ of the leading vehicle in the interval A2 corresponds to the average cruising speed value $\mu_3$ in the vehicle behavior database DBIII, and therefore selects the vehicle behavior database DBIII as the database to be used by the vehicle behavior prediction unit 146 (step S109). The processing then advances to step S110.

The vehicle behavior prediction unit 146 then predicts the vehicle behavior of the leading vehicle in the predetermined location such as an intersection by comparing the behavior characteristic information stored in the database selected from the vehicle behavior databases DBI, DBII, DBIII through the processing of step S106, step S108, or step S109 with the time series variation in the current travel condition information of the leading vehicle (step S110). The processing is then terminated. The prediction result of the vehicle behavior predicted through the processing of step S110 is used when the driving assist control unit 160 implements driving assist.

Hence, according to this embodiment, by selecting a vehicle behavior database that matches the cruising speed of the leading vehicle in the preceding location preceding the predetermined location, the vehicle behavior of the leading vehicle can be predicted using the behavior characteristic information stored in the selected vehicle behavior database. In other words, according to this embodiment, the database selection unit 145 can select appropriate behavior characteristic information in which the current cruising speed of the leading vehicle matches the cruising speed expected from the behavior characteristic information stored in the distribution database 150 before the vehicle behavior of the leading vehicle is predicted by the vehicle behavior prediction unit 146, and therefore the precision with which the vehicle behavior of the leading vehicle is predicted can be improved. As a result, more appropriate driving assist corresponding to the current traffic condition can be implemented on the host vehicle, and therefore the confidence of the driver of the vehicle 100 in the driving assist system can be increased.

[Second Embodiment]

In a second embodiment, an example in which an appropriate vehicle behavior database for use during vehicle behavior prediction is selected on the basis of a difference between the cruising speed average values indicated by the behavior characteristic information stored in the respective vehicle behavior databases DBI, DBII, DBIII in order to achieve a further improvement in the precision of the vehicle behavior prediction according to the first embodiment will be described with reference to FIGS. 8 to 10.

Figure 8:
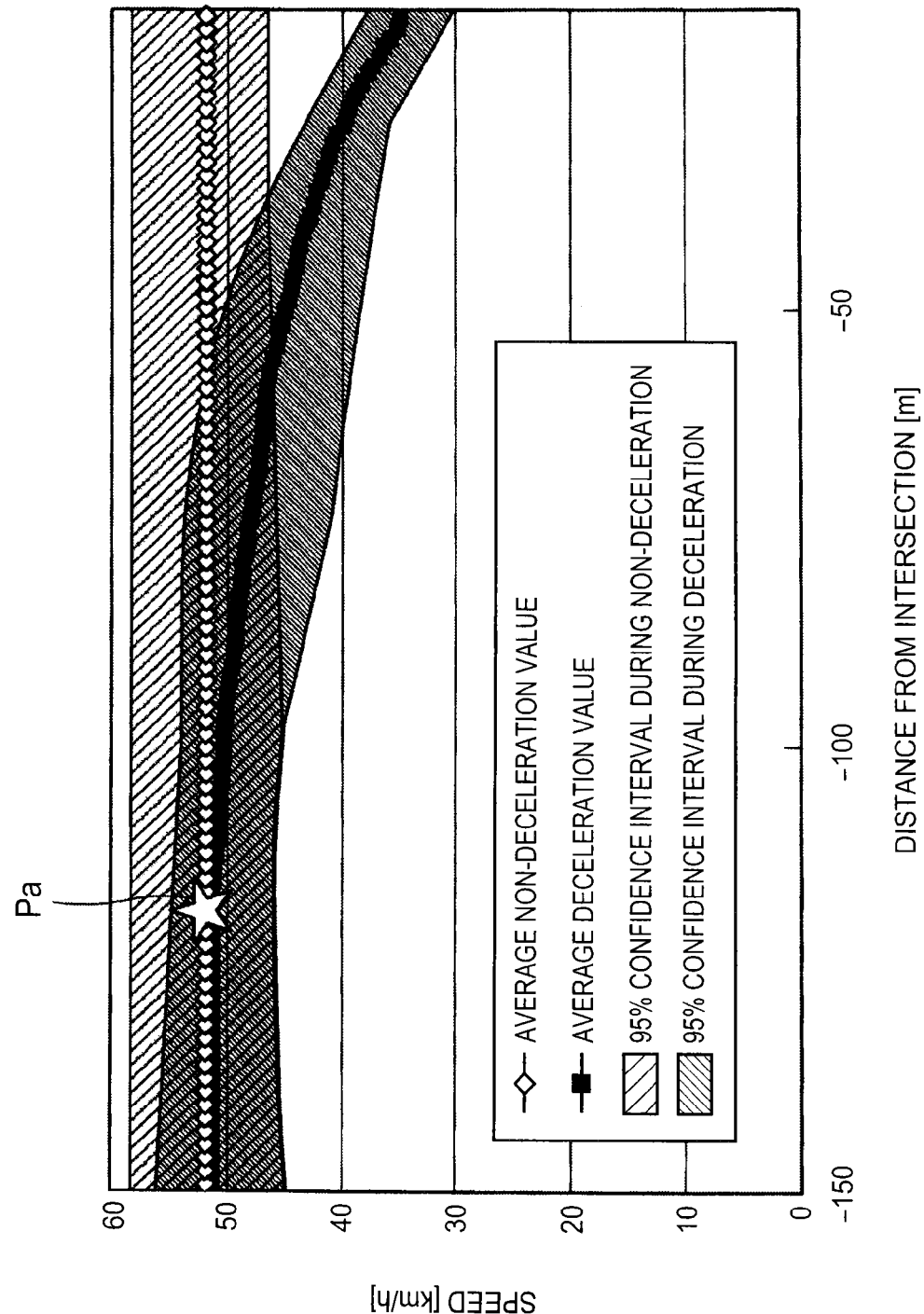
FIG. 8 is a graph showing an example of a timing at which a difference in patterns of time series variation appears in the behavior characteristic information of FIG. 5.
Figure 9:
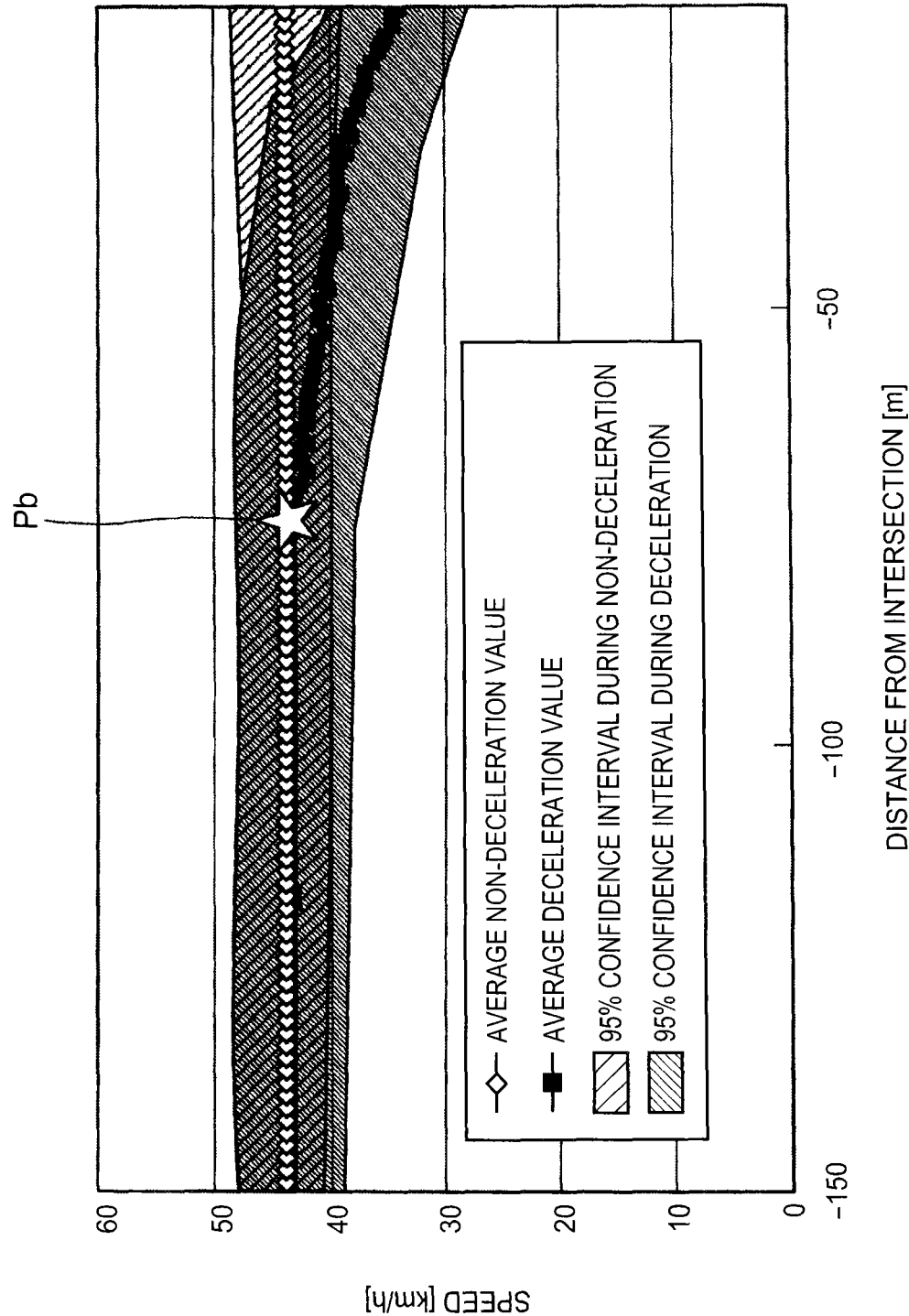
FIG. 9 is a graph showing an example of a timing at which a difference in patterns of time series variation appears in the behavior characteristic information of FIG. 6.

FIG. 8 is a graph showing an example of a timing at which a difference appears among patterns of time series variation in the behavior characteristic information of FIG. 5. FIG. 9 is a graph showing an example of a timing at which a difference appears among patterns of time series variation in the behavior characteristic information of FIG. 6. FIGS. 8 and 9 show examples of the behavior characteristic information stored during travel through an identical interval at different speeds. FIG. 8 shows an example of travel at a high cruising speed, and FIG. 9 shows an example of travel at a low cruising speed. As shown in FIGS. 8 and 9, when the cruising speed differs, positions (a position Pa indicated by a star in FIG. 8 and a position Pb indicated by a star in FIG. 9) in which a difference begins to appear in the average value of the cruising speed differ even during travel in an identical interval.

In this embodiment, therefore, a timing for selecting an appropriate vehicle behavior database matching the cruising speed of the leading vehicle is calculated roughly before selecting the vehicle behavior database DBI, DBII, DBIII to be used to predict the vehicle behavior of the leading vehicle. For example, when the database selection timing is delayed, a prediction start timing may also be delayed. Therefore, selecting the database at an appropriate selection timing is considered effective in improving the precision with which the vehicle behavior is predicted. Processing with which the prediction precision is improved even over that of the first embodiment will now be described with reference to FIG. 10. FIG. 10 is a flowchart showing an example of vehicle behavior prediction processing according to the second embodiment.

Figure 10:
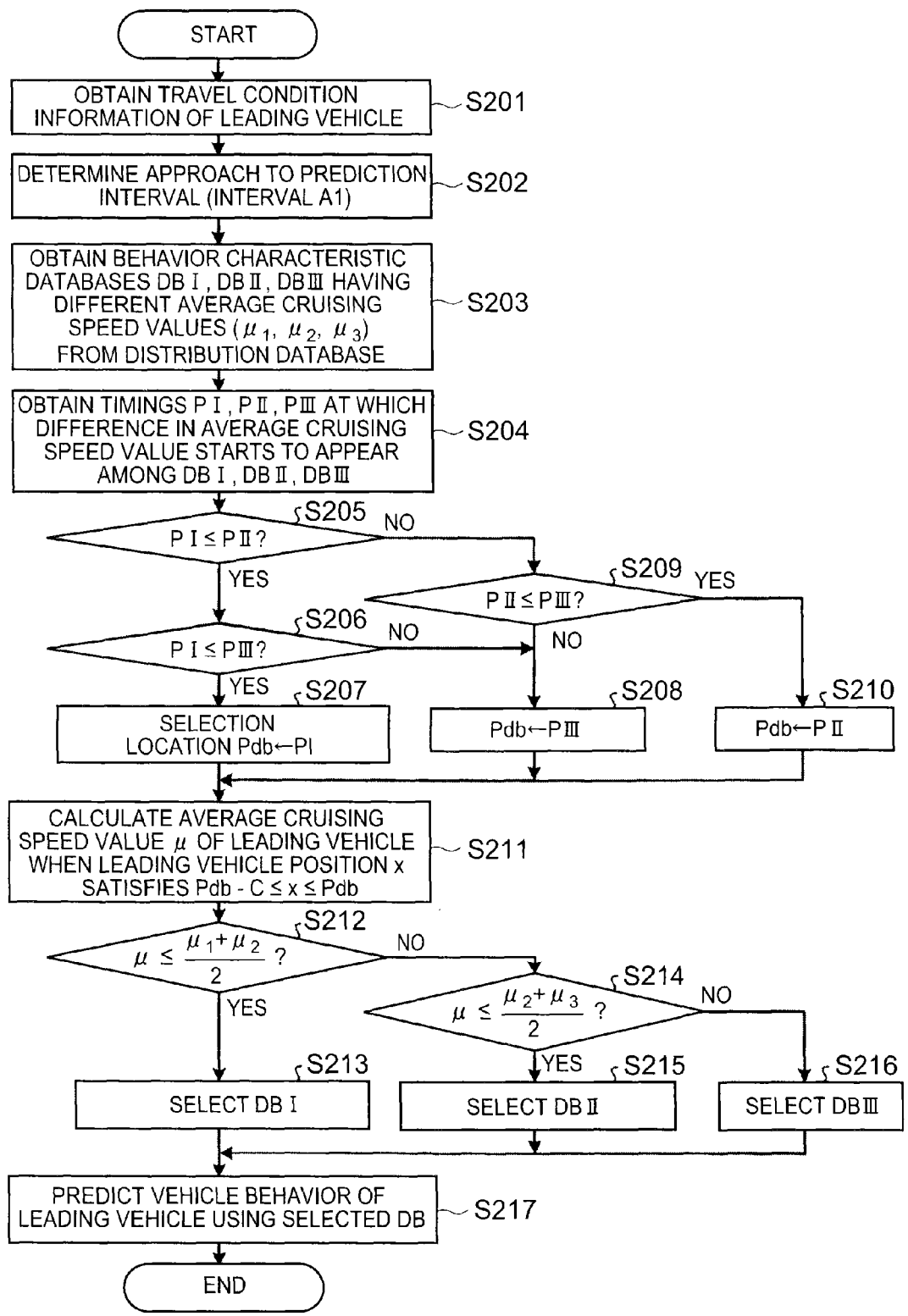
FIG. 10 is a flowchart showing an example of vehicle behavior prediction processing according to a second embodiment.

As shown in FIG. 10, the acquisition unit including the travel environment detection unit 120, the leading vehicle information acquisition unit 130, and so on obtains the travel condition information relating to the leading vehicle (step S201).

Next, the travel environment identification unit 142 determines that the leading vehicle has approached the prediction interval (the interval A1) in which the vehicle behavior of the vehicle 100 can be predicted on the basis of the latitude/longitude information and so on of the leading vehicle included in the travel condition information of the leading vehicle (step S202).

After the approach of the leading vehicle to the interval A1 has been determined, the database selection unit 145 obtains the plurality of vehicle behavior databases DBI, DBII, DBIII storing behavior characteristic information including approximately identical cruising speeds to the cruising speed of the leading vehicle but respectively different average cruising speed values from the distribution database 150 (step S203).

Next, the selection timing determination unit 145a obtains locations (timings) PI, PII, PIII at which a difference in the average cruising speed value (the average speed, for example) begins to appear in the behavior characteristic information stored respectively in the obtained vehicle behavior databases DBI, DBII, DBIII (step S204). In other words, the selection timing determination unit 145a determines selection locations (PI, PII, PIII) at which a difference in the average cruising speed value appears among the plurality of behavior characteristic information stored respectively in the plurality of vehicle behavior databases DBI, DBII, DBIII registered in the distribution database 150. The locations PI, PII, PII indicate distances from the predetermined location such as an intersection, and therefore take negative values when positioned in front of the predetermined location.

The selection timing determination unit 145a then performs following processing of steps S205 to S211 on the basis of the locations PI, PII, PIII obtained in step S204.

First, the selection timing determination unit 145a determines whether or not a following Formula 3 is established (step S205). In step S205, the selection timing determination unit 145a determines whether or not the location PI is further from the predetermined location than the location PII. In other words, the selection timing determination unit 145a determines whether or not the distance from the predetermined location indicated by the location PI is equal to or smaller than the distance from the predetermined location indicated by the location PII.

$$PI \leq PII \qquad \text{Formula 3}$$

When determining that Formula 3 is established (step S205: Yes), the selection timing determination unit 145a determines whether or not a following Formula 4 is established (step S206). In step S206, the selection timing determination unit 145a determines whether or not the location PI is further from the predetermined location than the location PIII. In other words, the selection timing determination unit 145a determines whether or not the distance from the predetermined location indicated by the location PI is equal to or smaller than the distance from the predetermined location indicated by the location PIII.

$$PI \leq PIII \qquad \text{Formula 4}$$

When determining that Formula 4 is established (step S206: Yes), the selection timing determination unit 145a sets the location PI as a selection location (timing) Pdb to be used to select an appropriate database from the vehicle behavior databases DBI, DBII, DBIII (step S207). The processing then advances to step S211.

When determining that Formula 4 is not established (step S206: No), on the other hand, the selection timing determination unit 145a sets the location PIII as the selection location Pdb to be used to select an appropriate database from the vehicle behavior databases DBI, DBII, DBIII (step S208). The processing then advances to step S211.

Returning to the processing of step S205, when determining that Formula 3 is not established (step S205: No), the selection timing determination unit 145a determines whether or not a following Formula 5 is established (step S209). In step S209, the selection timing determination unit 145a determines whether or not the location PII is further from the predetermined location than the location PIII. In other words, the selection timing determination unit 145a determines whether or not the distance from the predetermined location indicated by the location PII is equal to or smaller than the distance from the predetermined location indicated by the location PIII.

$$PII \leq PIII \qquad \text{Formula 5}$$

When determining that Formula 5 is not established (step S209: No), the selection timing determination unit 145a sets the location PIII as the selection location Pdb to be used to select an appropriate database from the vehicle behavior databases DBI, DBII, DBIII (step S208). The processing then advances to step S211.

When it is determined that Formula 5 is established (step S209: Yes), on the other hand, the selection timing determination unit 145a sets the location PII as the selection location Pdb to be used to select an appropriate database from the vehicle behavior databases DBI, DBII, DBIII (step S210). The processing then advances to step S211.

The selection timing determination unit 145a then calculates the average cruising speed value (the average travel speed value, for example) u of the leading vehicle when a position x of the leading vehicle satisfies "Pdb−C≤x≤Pdb (where C is a constant)" (step S211). In other words, the selection timing determination unit 145a calculates the average cruising speed value of the leading vehicle in the selection location on the basis of the travel condition information obtained by the acquisition unit upon arrival of the leading vehicle in the selection location Pdb.

Next, the database selection unit 145 determines whether or not the following Formula 1 is established on the basis of the average cruising speed value μ calculated in step S211 (step S212).

$$\mu \leq \frac{\mu_1 + \mu_2}{2} \qquad \text{Formula 1}$$

When it is determined that Formula 1 is established (step S212: Yes), the database selection unit 145 determines that the average cruising speed value μ of the leading vehicle in the selection location corresponds to the average cruising speed value $\mu_1$ in the vehicle behavior database DBI, and therefore selects the vehicle behavior database DBI as the database to be used by the vehicle behavior prediction unit 146 (step S213). The processing then advances to step S217.

When the database selection unit 145 determines that Formula 1 is not established (step S212: No), on the other hand, the average cruising speed value μ of the leading vehicle in the selection location may correspond to the average cruising speed value $\mu_2$ or $\mu_3$ in the vehicle behavior database DBII or DBIII. Therefore, the database selection unit 145 determines, on the basis of the average cruising speed value μ of the leading vehicle in the selection location, whether or not the following Formula 2 is established (step S214).

$$\mu \leq \frac{\mu_2 + \mu_3}{2} \qquad \text{Formula 2}$$

When it is determined that Formula 2 is established (step S214: Yes), the database selection unit 145 determines that the average cruising speed value μ of the leading vehicle in the selection location corresponds to the average cruising speed value $\mu_2$ in the vehicle behavior database DBII, and therefore selects the vehicle behavior database DBII as the database to be used by the vehicle behavior prediction unit 146 (step S215). The processing then advances to step S217.

When it is determined that Formula 2 is not established (step S214: No), on the other hand, the database selection unit 145 determines that the average cruising speed value μ of the leading vehicle in the selection location corresponds to the average cruising speed value $\mu_3$ in the vehicle behavior database DBIII, and therefore selects the vehicle behavior database DBIII as the database to be used by the vehicle behavior prediction unit 146 (step S216). The processing then advances to step S217.

The vehicle behavior prediction unit 146 then predicts the vehicle behavior of the leading vehicle in the predetermined location such as an intersection by comparing the behavior characteristic information stored in the database selected from the vehicle behavior databases DBI, DBII, DBIII through the processing of step S213, step S215, or step S216 with the time series variation in the current travel condition information of the leading vehicle (step S217). The processing is then terminated. The prediction result of the vehicle behavior predicted through the processing of step S217 is used when the driving assist control unit 160 implements driving assist.

Hence, according to this embodiment, the plurality of vehicle behavior databases can be obtained on the basis of the cruising speed of the leading vehicle in a preceding location preceding the predetermined location, and the database selection timing can be determined on the basis of the characteristics of the behavior characteristic information stored in the obtained plurality of vehicle behavior databases. According to this embodiment, therefore, the vehicle behavior database that matches the cruising speed of the leading vehicle in the preceding location preceding the predetermined location can be selected at the determined selection timing, whereby the vehicle behavior of the leading vehicle can be predicted using the behavior characteristic information stored in the selected vehicle behavior database. As a result, in this embodiment, an appropriate database can be selected flexibly in accordance with variation in the speed of the leading vehicle, enabling a further improvement in the precision with which the vehicle behavior of the leading vehicle is predicted.

[Third Embodiment]

In a third embodiment, an example in which an appropriate vehicle behavior database is selected on the basis of a characteristic of the prediction location in order to achieve a further improvement in the precision of the vehicle behavior prediction according to the first embodiment will be described with reference to FIGS. 11A to 12B.

Figure 11A:
FIG. 11A is a view showing a case in which a prediction interval is constituted by a flat road.
Figure 11B:
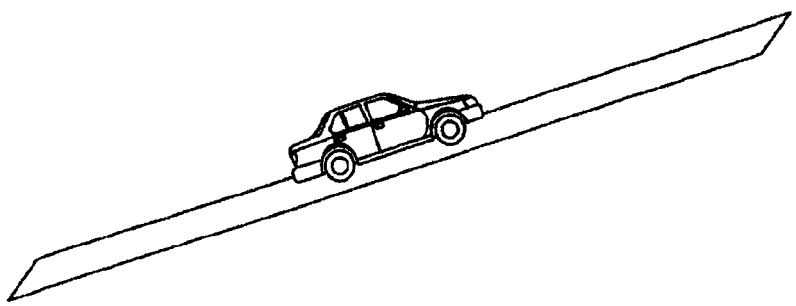
FIG. 11B is a view showing a case in which the prediction interval is constituted by an uphill road having a large gradient.
Figure 11C:
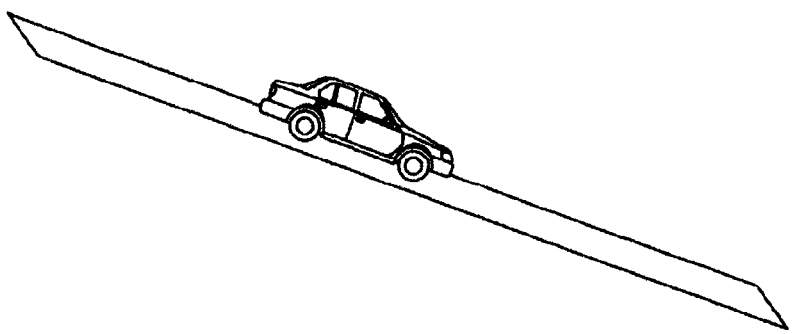
FIG. 11C is a view showing a case in which the prediction interval is constituted by a downhill road having a large gradient.

FIG. 11A is a view showing a case in which the prediction interval is constituted by a flat road. FIG. 11B is a view showing a case in which the prediction interval is constituted by an uphill road having a large gradient. FIG. 11C is a view showing a case in which the prediction interval is constituted by a downhill road having a large gradient. Envisaging, for example, a plurality of prediction intervals B1 to B3 in which the cruising speed is substantially identical, the prediction interval B1 may be constituted by a flat road, as shown in FIG. 11A, the prediction interval B2 may be constituted by an uphill road having a large gradient, as shown in FIG. 11B, and the prediction interval B3 may be constituted by a downhill road having a large gradient, as shown in FIG. 11C.

Here, vehicle behavior databases storing travel speed behavior characteristic information (in FIGS. 12A and 12B, speed DBs such as DBvI, DBvII, and DBvIII) and vehicle behavior databases storing acceleration behavior characteristic information (in FIGS. 12A and 12B, acceleration DBs such as DBaI, DBaII, and DBaIII) are registered in the distribution database according to this embodiment. Therefore, to achieve a further improvement in the precision of vehicle behavior prediction, it is desirable to select an appropriate behavior characteristic database matching the characteristic of the prediction interval. In the prediction interval B1 shown in FIG. 11A, no particular difference is observed between the speed behavior characteristic information and the acceleration behavior characteristic information, but in the prediction interval B2 and the prediction interval B3 shown respectively in FIGS. 11B and 11C, which have gradients that affect the acceleration, a difference is highly likely to be observed between the speed behavior characteristic information and the acceleration behavior characteristic information. For example, in the prediction interval B2 shown in FIG. 11B, it is assumed that the driver of the vehicle 100 must depress the accelerator firmly up to the vicinity of the predetermined location such as an intersection during both deceleration and non-deceleration in order to reach the top of the slope. In this case, a vehicle behavior database storing the acceleration behavior characteristic information (an acceleration DB) is preferably selected over a vehicle behavior database (a speed DB) storing the travel speed behavior characteristic information envisaging the prediction interval B1 shown in FIG. 11A. Further, in the prediction interval B3 shown in FIG. 11C, the vehicle 100 accelerates due to the gradient during both deceleration and non-deceleration, and it is therefore assumed that the driver of the vehicle 100 must decelerate to prevent overspeeding In this case, an acceleration DB storing the acceleration behavior characteristic information is preferably selected over a speed DB storing the travel speed behavior characteristic information envisaging the prediction interval B1 shown in FIG. 11A.

Figure 12A:
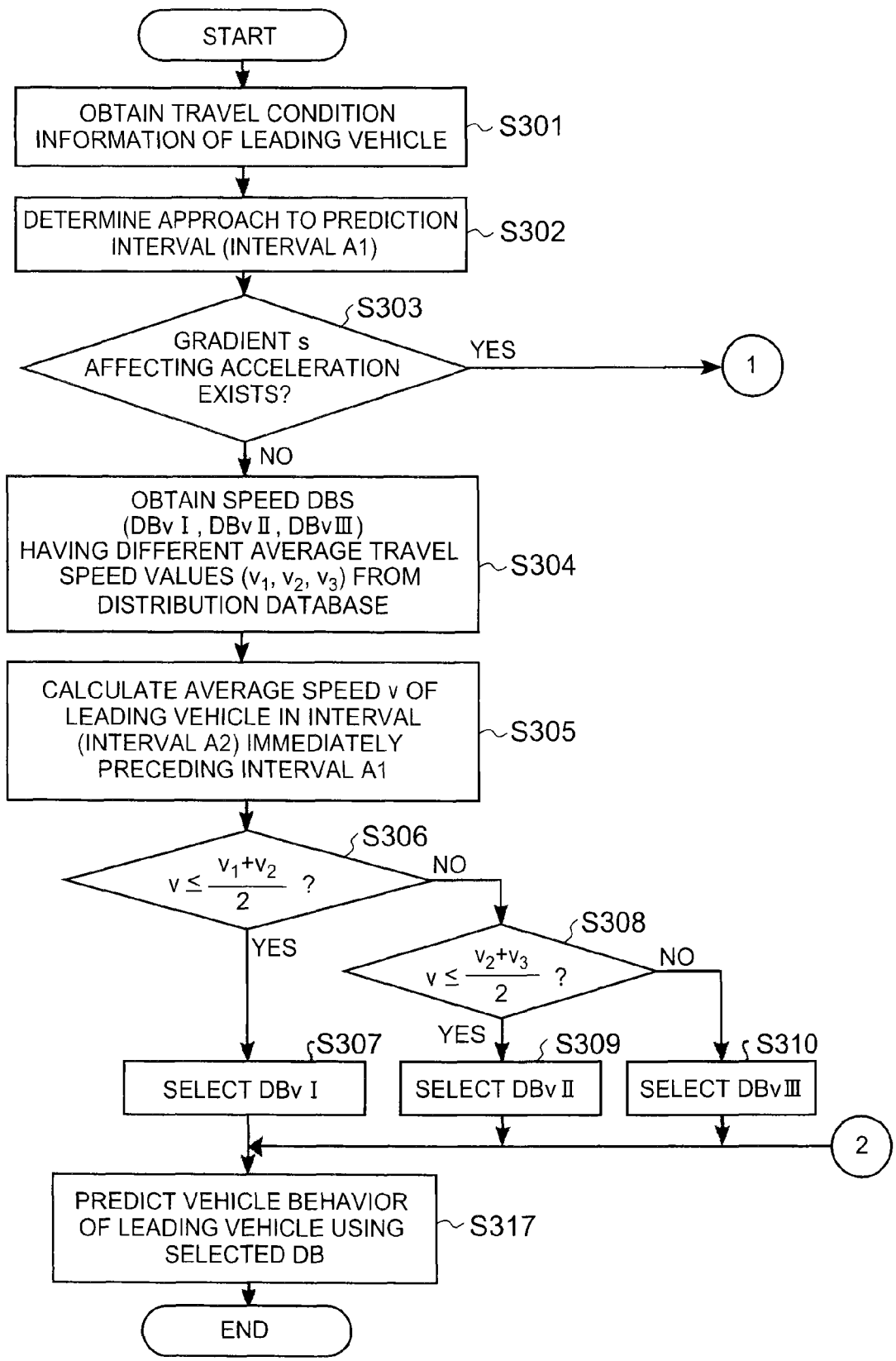
FIGS. 12A and 12B are flowcharts showing an example of vehicle behavior prediction processing according to a third embodiment.
Figure 12B:
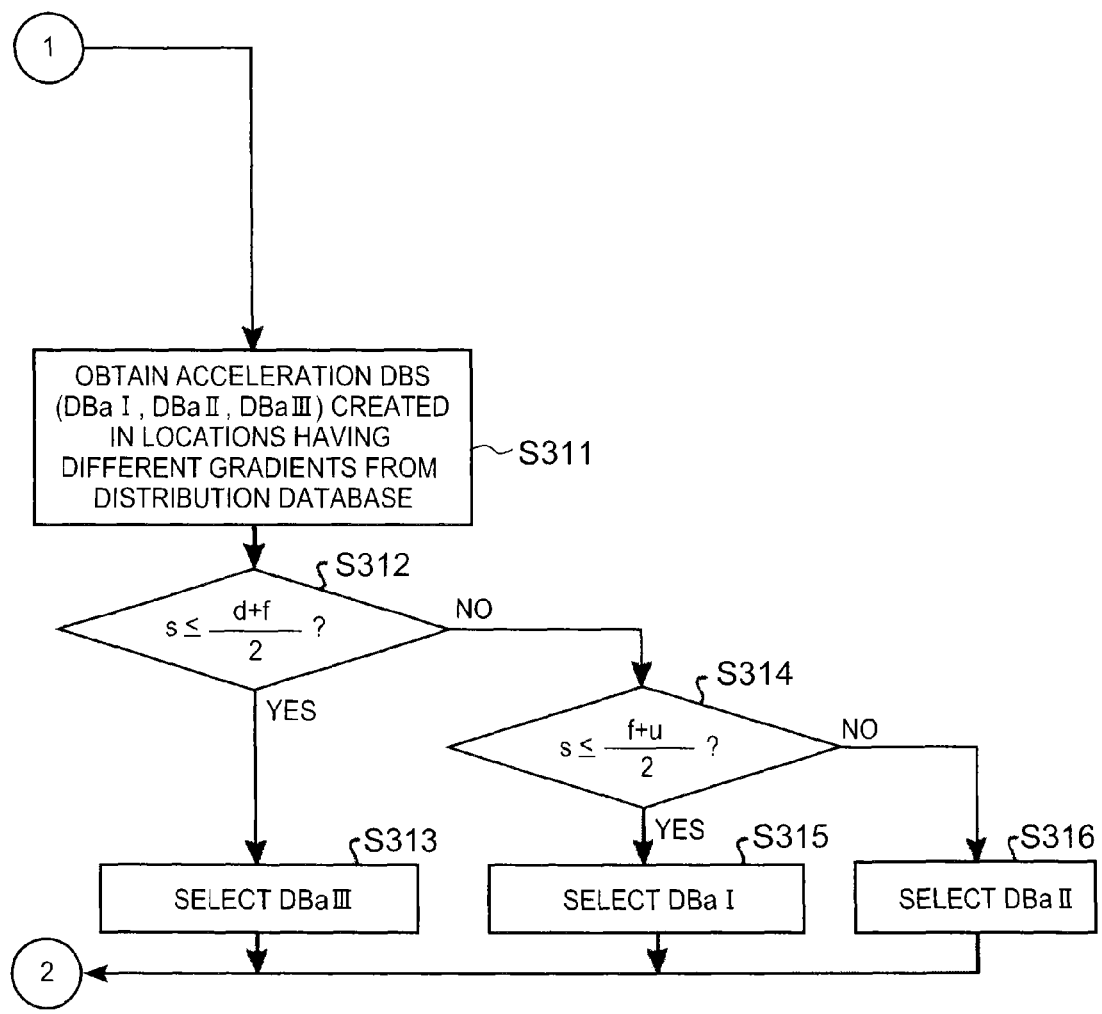

Hence, in this embodiment, it is determined whether a speed DB is selected to predict the vehicle behavior of the leading vehicle using the travel speed behavior characteristic information stored in the selected speed DB, or an acceleration DB is selected to predict the vehicle behavior of the leading vehicle using the acceleration behavior characteristic information stored in the selected acceleration DB. Processing for achieving a further improvement in the prediction precision over the first embodiment will now be described with reference to FIGS. 12A and 12B. FIGS. 12A and 12B are flowcharts showing an example of vehicle behavior prediction processing according to the third embodiment.

As shown in FIGS. 12A and 12B, the acquisition unit including the travel environment detection unit 120, the leading vehicle information acquisition unit 130, and so on obtains the travel condition information relating to the leading vehicle (step S301).

Next, the travel environment identification unit 142 determines that the leading vehicle has approached the prediction interval (the interval A1) in which the vehicle behavior of the vehicle 100 can be predicted on the basis of the latitude/longitude information and so on of the leading vehicle included in the travel condition information of the leading vehicle (step S302).

After the approach of the leading vehicle to the interval A1 has been determined, the database selection unit 145 determines whether or not the interval A1 has a gradient s that affects the acceleration (step S303).

When it is determined that the interval A1 does not have a gradient s that affects the acceleration (step S303: No), the speed DB selection unit 145*b* obtains the plurality of speed DBs (DBvI, DBvII, DBvIII) storing travel speed behavior characteristic information including approximately identical travel speeds to the travel speed of the leading vehicle but respectively different average travel speed values from the distribution database 150 (step S304). In this embodiment, the average travel speed values in the respective vehicle behavior databases DBvI, DBvII, DBvIII obtained in step S304 are denoted by $v_1$, $v_2$, $v_3$. A magnitude relationship between these average travel speed values is set at $v_1 < v_2 < v_3$.

On the basis of the information indicating travel conditions such as the travel speed of the leading vehicle and so on, the speed DB selection unit 145*b* calculates an average travel speed value v of the leading vehicle in the interval (the interval A2) immediately before arrival of the leading vehicle in the interval A1 (step S305).

On the basis of the average travel speed value v of the leading vehicle in the interval A2, the speed DB selection unit 145*b* determines whether or not a following Formula 6 is established (step S306).

$$v \leq \frac{v_1 + v_2}{2} \quad \text{Formula 6}$$

When it is determined that Formula 6 is established (step S306: Yes), the speed DB selection unit 145*b* determines that the average speed v of the leading vehicle in the interval A2 corresponds to the average travel speed value $v_1$ in the vehicle behavior database DBvI, and therefore selects the vehicle behavior database DBvI as the database to be used by the vehicle behavior prediction unit 146 (step S307). The processing then advances to step S317.

When the speed DB selection unit 145*b* determines that Formula 6 is not established (step S306: No), on the other hand, the average speed v of the leading vehicle in the interval A2 may correspond to the average travel speed value $v_2$ or $v_3$ in the vehicle behavior database DBvII or DBvIII. Therefore, the speed DB selection unit 145*b* determines, on the basis of the average speed v of the leading vehicle in the interval A2, whether or not a following Formula 7 is established (step S308).

$$v \leq \frac{v_2 + v_3}{2} \quad \text{Formula 7}$$

When it is determined that Formula 7 is established (step S308: Yes), the speed DB selection unit 145*b* determines that the average speed v of the leading vehicle in the interval A2 corresponds to the average travel speed value $v_2$ in the vehicle behavior database DBvII, and therefore selects the vehicle behavior database DBvII as the database to be used by the vehicle behavior prediction unit 146 (step S309). The processing then advances to step S317.

When it is determined that Formula 7 is not established (step S308: No), on the other hand, the speed DB selection unit 145*b* determines that the average speed v of the leading vehicle in the interval A2 corresponds to the average travel speed value $v_3$ in the vehicle behavior database DBvIII, and therefore selects the vehicle behavior database DBvIII as the database to be used by the vehicle behavior prediction unit 146 (step S310). The processing then advances to step S317.

Returning to the processing of step S303, when it is determined that the interval A1 has a gradient s that affects the acceleration (step S303: Yes), the acceleration DB selection unit 145*c* obtains the plurality of acceleration DBs (DBaI, DBaII, DBaIII) storing acceleration behavior characteristic information created in locations having different gradients from the distribution database 150 (step S311). In this embodiment, the gradients in the respective vehicle behavior databases (acceleration DBs) DBaI, DBaII, DBaIII obtained in step S311 are denoted by f, u, d. A magnitude relationship between average values of these gradients is set at d≤f≤u.

On the basis of the gradients f, u, d in DBaI, DBaII, DBaIII obtained in step S311, the acceleration DB selection unit 145*c* performs following processing of steps S312 to S316.

First, the acceleration DB selection unit 145*c* determines whether or not a following Formula 8 is established (step S312). In step S312, the acceleration DB selection unit 145*c* determines whether or not a magnitude of the gradient s is equal to or smaller than a magnitude of an average value based on the gradient d and the gradient f.

$$s \leq \frac{d + f}{2} \quad \text{Formula 8}$$

When it is determined that Formula 8 is established (step S312: Yes), the acceleration DB selection unit 145*c* determines that the gradient s corresponds to the gradient d in the vehicle behavior database DBaIII, and therefore selects the vehicle behavior database DBaIII as the database to be used by the vehicle behavior prediction unit 146 (step S313). The processing then advances to step S317.

When the acceleration DB selection unit 145*c* determines that Formula 8 is not established (step S312: No), on the other hand, the gradient s may correspond to the gradient f or the gradient u in the vehicle behavior database DBaI or DBaII. Therefore, the acceleration DB selection unit 145*c* determines, on the basis of the gradient s, whether or not a following Formula 9 is established (step S314). In step S314, the acceleration DB selection unit 145*c* determines whether or not the magnitude of the gradient s is equal to or smaller than a magnitude of an average value based on the gradient f and the gradient u.

$$s \le \frac{f+u}{2} \quad \text{Formula 9}$$

When it is determined that Formula 9 is established (step S314: Yes), the acceleration DB selection unit 145c determines that the gradient s corresponds to the gradient f in the vehicle behavior database DBaI, and therefore selects the vehicle behavior database DBaI as the database to be used by the vehicle behavior prediction unit 146 (step S315). The processing then advances to step S317.

When it is determined that Formula 9 is not established (step S314: No), on the other hand, the acceleration DB selection unit 145c determines that the gradient s corresponds to the gradient u in the vehicle behavior database DBaII, and therefore selects the vehicle behavior database DBaII as the database to be used by the vehicle behavior prediction unit 146 (step S316). The processing then advances to step S317.

The vehicle behavior prediction unit 146 then predicts the vehicle behavior of the leading vehicle in the predetermined location such as an intersection by comparing the behavior characteristic information stored in the database selected from the speed DBs such as the vehicle behavior databases DBvI, DBvII, DBvIII and the acceleration DBs such as the vehicle behavior databases DBaI, DBaII, DBaIII through the processing of step S307, step S309, step S310, step S313, step S315 or step S316 with the time series variation in the current travel condition information of the leading vehicle (step S317). The processing is then terminated. The prediction result of the vehicle behavior predicted through the processing of step S317 is used when the driving assist control unit 160 implements driving assist.

Hence, according to this embodiment, when a gradient or the like that affects acceleration exists in the prediction interval, an appropriate vehicle behavior database can be selected on the basis of the characteristic of the interval, and therefore the precision with which the vehicle behavior of the leading vehicle is predicted can be improved even further. Note that in the example shown in FIGS. 12A and 12B, the gradient is described as an example of an element that affects acceleration, but the invention is not limited thereto, and another element that may affect acceleration may be employed. For example, the shape of the intersection, the road shape, the road width, the number of lanes, the road curvature, the presence of an infrastructure device such as a traffic light, the presence of a traffic regulation such as a temporary stop position, the speed limit, and so on may be cited as elements other than the road surface gradient.

The vehicle behavior prediction processing illustrated above in the first to third embodiments is not limited to the examples shown in FIGS. 7, 10, and 12, and may be executed in appropriate combinations. Further, in the first to third embodiments, the leading vehicle is described as an example of a vehicle behavior prediction subject, but the vehicle behavior prediction processing of the first to third embodiments may be applied similarly to a case in which the vehicle behavior of the host vehicle is predicted. In this case, driving assist may be implemented on the host vehicle in the following manner on the basis of the prediction result obtained in relation to the vehicle behavior of the host vehicle.

For example, driving assist may be implemented on the host vehicle such that when a prediction result relating to the vehicle behavior of the host vehicle is input into the assist implementation unit 161 from the vehicle behavior prediction unit 146, the assist implementation unit 161 determines control amounts of the various control devices controlled by the system control unit 141, for example, on the basis of the prediction result, and outputs the determined control amounts to the system control unit 141. Hence, when the prediction result from the vehicle behavior prediction unit 146 indicates deceleration behavior in the host vehicle, for example, an engine is switched OFF or an accelerator is switched OFF at or before a deceleration timing of the host vehicle. When the vehicle 100 is a hybrid vehicle, the assist implementation unit 161 executes regenerative braking at or before the deceleration timing of the host vehicle. As a result, the assist implementation unit 161 can implement energy loss reduction assist on the vehicle 100 when the host vehicle decelerates or before the host vehicle starts to decelerate. When, on the other hand, the prediction result obtained by the vehicle behavior prediction unit 146 indicates that deceleration behavior will not occur in the host vehicle, or in other words that the vehicle behavior of the host vehicle is non-deceleration behavior, the assist implementation unit 161 does not execute deceleration assist via the system control unit 141. Likewise when a prediction result indicating that the vehicle behavior of the host vehicle is uncertain is input from the vehicle behavior prediction unit 146, the assist implementation unit 161 does not execute deceleration assist via the system control unit 141.

Alternatively, the assist implementation unit 161 may implement driving assist in accordance with the conditions, taking into consideration vehicle behavior prediction results input from the vehicle behavior prediction unit 146 in relation to both the leading vehicle and the host vehicle. Moreover, the vehicle behavior may be acceleration behavior or non-acceleration behavior performed by the vehicle 100 or the leading vehicle, for example. In this case, the assist implementation unit 161 may implement driving assist in accordance with the conditions on the basis of a prediction result predicting either acceleration behavior or non-acceleration behavior as the vehicle behavior of the leading vehicle or the host vehicle.

As described above, one aspect of the invention is a vehicle behavior prediction apparatus including: a storage device that stores a plurality of pieces of behavior characteristic information that is information associating a vehicle behavior of a vehicle with a characteristic of time series variation in travel condition information, the plurality of pieces of the behavior characteristic information being divided into a plurality of patterns corresponding to the different traffic conditions in a preceding location preceding a predetermined location; an acquisition unit that obtains the travel condition information of the vehicle; a selection unit that selects, as corresponding behavior characteristic information, the behavior characteristic information having a pattern that corresponds to a current traffic condition from among the plurality of pieces of the behavior characteristic information stored in the storage device on the basis of the travel condition information obtained by the acquisition unit upon arrival of the vehicle in the preceding location; and a prediction unit that predicts the vehicle behavior of the vehicle in the predetermined location by comparing the corresponding behavior characteristic information selected by the selection unit with the time series variation in the travel condition information of the vehicle currently obtained by the acquisition unit.

The traffic condition may includes at least one of a travel speed and an acceleration of the vehicle in the preceding location, and a plurality of average values of the at least one of the travel speed and the acceleration may be associated respectively with the plurality of pieces of the behavior characteristic information stored in the storage device. In this case, the selection unit may calculate the average value of the at least one of the travel speed and the acceleration on the basis of the travel condition information obtained by the acquisition unit upon arrival of the vehicle in the preceding location, and may select the corresponding behavior characteristic information by determining the average value of the at least one of the travel speed and the acceleration, from among the plurality of average values of the at least one of the travel speed and the acceleration associated respectively with the plurality of pieces of the behavior characteristic information, to which the calculated average value of the at least one of the travel speed and the acceleration corresponds.

The traffic condition may include a road surface gradient in the preceding location, and a plurality of road surface gradients may be associated respectively with the plurality of pieces of the behavior characteristic information stored in the storage device. In this case, the selection unit may obtain the road surface gradient on the basis of the travel condition information obtained by the acquisition unit upon arrival of the vehicle in the preceding location and may determine whether or not the road surface gradient is a gradient that affects the acceleration. Further, when determining that the road surface gradient is a gradient that affects the acceleration, the selection unit may selects the corresponding behavior characteristic information by determining the road surface gradient, from among the plurality of road surface gradients associated respectively with the plurality of pieces of the behavior characteristic information, to which the road surface gradient corresponds, and, when determining that the road surface gradient is not a gradient that affects the acceleration, the selection unit may calculate the average value of the at least one of the travel speed and the acceleration on the basis of the travel condition information obtained by the acquisition unit upon arrival of the vehicle in the preceding location, and selects the corresponding behavior characteristic information by determining the average value of the at least one of the travel speed and the acceleration, from among the plurality of average values of the at least one of the travel speed and the acceleration associated respectively with the plurality of pieces of the behavior characteristic information, to which the calculated average value of the at least one of the travel speed and the acceleration corresponds.

The selection unit may determine at least one selection location in which a difference in the average value of the at least one of the travel speed and the acceleration appears among the plurality of behavior characteristic information, and may calculate the average value of the at least one of the travel speed and the acceleration of the vehicle in the at least one selection location on the basis of the travel condition information obtained by the acquisition unit upon arrival of the vehicle in the selection location.

When a plurality of selection locations are determined, the selection unit may calculate the average value of the at least one of the travel speed and the acceleration of the vehicle on the basis of the selection location positioned furthest from the predetermined location.

The behavior characteristic information may include behavior characteristic information relating to a travel speed and behavior characteristic information relating to an acceleration. In this case, the selection unit may determine whether or not an element affecting the acceleration exists in the preceding location. Further, when determining that the element affecting the acceleration exists in the preceding location, the selection unit may select the behavior characteristic information relating to the acceleration as the corresponding behavior characteristic information, and, when determining that the element affecting the acceleration does not exist in the preceding location, the selection unit may select the behavior characteristic information relating to the travel speed as the corresponding behavior characteristic information.

The selection unit may determine whether or not the element affecting the acceleration exists on the basis of a road surface gradient in the preceding location.

The behavior characteristic information may be information on the basis of a probability distribution indicating probabilities of occurrence of the vehicle behavior in the vehicle.

The prediction unit may predict the vehicle behavior on the basis of whether or not the probability distribution includes time series variation in the travel condition.

The behavior characteristic information may be created for each travel location. In this case, the prediction unit may identify the travel location of the vehicle and compares the corresponding behavior characteristic information created in a location corresponding to the identified travel location with the time series variation in the travel condition information.

The behavior characteristic information may be created for each travel environment. In this case, when the corresponding behavior characteristic information created in the location corresponding to the identified travel location is not stored in the storage device, the prediction unit may compare the corresponding behavior characteristic information created in a similar travel environment to the travel environment of the vehicle with the time series variation in the travel condition information.

The prediction unit may predict, as the vehicle behavior, one of occurrence of deceleration behavior and occurrence of acceleration behavior by the vehicle in the predetermined location.

What is claimed is:

1. A vehicle behavior prediction apparatus comprising:
 a storage device that stores a plurality of pieces of behavior characteristic information that is information associating a vehicle behavior of a vehicle with a characteristic of time series variation in travel condition information, the plurality of pieces of the behavior characteristic information being divided into a plurality of patterns corresponding to different traffic conditions in a preceding location preceding a predetermined location;
 acquisition circuitry configured to obtain travel condition information of the vehicle;
 selection circuitry configured to select, as corresponding behavior characteristic information, behavior characteristic information having a pattern that corresponds to a current traffic condition from among the plurality of pieces of the behavior characteristic information stored in the storage device on the basis of the travel condition information obtained by the acquisition circuitry upon arrival of the vehicle in the preceding location; and
 prediction circuitry configured to:
  predict vehicle behavior of the vehicle in the predetermined location by comparing the corresponding behavior characteristic information selected by the selection circuitry with the time series variation in the travel condition information of the vehicle currently obtained by the acquisition circuitry, and
  output a prediction result based upon the predicted vehicle behavior of the vehicle to driving assist control circuitry configured to perform driving assist based upon the prediction result,
 wherein the prediction circuitry is configured to predict, as the vehicle behavior, one of occurrence of deceleration behavior and occurrence of acceleration behavior by the vehicle in the predetermined location.

2. The vehicle behavior prediction apparatus according to claim 1, wherein:
the traffic condition includes at least one of a travel speed and an acceleration of the vehicle in the preceding location;
a plurality of average values of the at least one of the travel speed and the acceleration are associated respectively with the plurality of pieces of the behavior characteristic information stored in the storage device;
the selection circuitry is configured to calculate the average value of the at least one of the travel speed and the acceleration on the basis of the travel condition information obtained by the acquisition circuitry upon arrival of the vehicle in the preceding location; and
the selection circuitry is configured to select the corresponding behavior characteristic information by determining the average value of the at least one of the travel speed and the acceleration, from among the plurality of average values of the at least one of the travel speed and the acceleration associated respectively with the plurality of pieces of the behavior characteristic information, to which the calculated average value of the at least one of the travel speed and the acceleration corresponds.

3. The vehicle behavior prediction apparatus according to claim 2, wherein:
the traffic condition includes a road surface gradient in the preceding location;
a plurality of road surface gradients are associated respectively with the plurality of pieces of the behavior characteristic information stored in the storage device;
the selection circuitry is configured to obtain the road surface gradient on the basis of the travel condition information obtained by the acquisition circuitry upon arrival of the vehicle in the preceding location;
the selection circuitry is configured to determine whether or not the road surface gradient is a gradient that affects the acceleration;
when determining that the road surface gradient is a gradient that affects the acceleration, the selection circuitry is configured to select the corresponding behavior characteristic information by determining the road surface gradient, from among the plurality of road surface gradients associated respectively with the plurality of pieces of the behavior characteristic information, to which the road surface gradient corresponds; and
when determining that the road surface gradient is not a gradient that affects the acceleration, the selection circuitry is configured to calculate the average value of the at least one of the travel speed and the acceleration on the basis of the travel condition information obtained by the acquisition circuitry upon arrival of the vehicle in the preceding location, and select the corresponding behavior characteristic information by determining the average value of the at least one of the travel speed and the acceleration, from among the plurality of average values of the at least one of the travel speed and the acceleration associated respectively with the plurality of pieces of the behavior characteristic information, to which the calculated average value of the at least one of the travel speed and the acceleration corresponds.

4. The vehicle behavior prediction apparatus according to claim 2, wherein the selection circuitry is configured to determine at least one selection location in which a difference in the average value of the at least one of the travel speed and the acceleration appears among the plurality of behavior characteristic information, and calculate the average value of the at least one of the travel speed and the acceleration of the vehicle in the at least one selection location on the basis of the travel condition information obtained by the acquisition circuitry upon arrival of the vehicle in the selection location.

5. The vehicle behavior prediction apparatus according to claim 4, wherein, when a plurality of selection locations are determined, the selection circuitry is configured to calculate the average value of the at least one of the travel speed and the acceleration of the vehicle on the basis of the selection location positioned furthest from the predetermined location.

6. The vehicle behavior prediction apparatus according to claim 1, wherein:
the behavior characteristic information includes behavior characteristic information relating to a travel speed and behavior characteristic information relating to an acceleration;
the selection circuitry is configured to determine whether or not an element affecting the acceleration exists in the preceding location;
when determining that the element affecting the acceleration exists in the preceding location, the selection circuitry is configured to select the behavior characteristic information relating to the acceleration as the corresponding behavior characteristic information; and
when determining that the element affecting the acceleration does not exist in the preceding location, the selection circuitry is configured to select the behavior characteristic information relating to the travel speed as the corresponding behavior characteristic information.

7. The vehicle behavior prediction apparatus according to claim 6, wherein the selection circuitry is configured to determine whether or not the element affecting the acceleration exists on the basis of a road surface gradient in the preceding location.

8. The vehicle behavior prediction apparatus according to claim 1, wherein the behavior characteristic information is information on the basis of a probability distribution indicating probabilities of occurrence of the vehicle behavior in the vehicle.

9. The vehicle behavior prediction apparatus according to claim 8, wherein the prediction circuitry is configured to predict the vehicle behavior on the basis of whether or not the probability distribution includes time series variation in the travel condition.

10. A vehicle behavior prediction method comprising:
storing a plurality of pieces of behavior characteristic information that is information associating a vehicle behavior of a vehicle with a characteristic of time series variation in travel condition information, in a storage device, the plurality of pieces of the behavior characteristic information being divided into a plurality of patterns corresponding to different traffic conditions in a preceding location preceding a predetermined location;
obtaining travel condition information of the vehicle;
selecting, as corresponding behavior characteristic information, behavior characteristic information having a pattern that corresponds to a current traffic condition from among the plurality of pieces of the behavior characteristic information stored in the storage device on the basis of the travel condition information obtained upon arrival of the vehicle in the preceding location;
predicting vehicle behavior of the vehicle in the predetermined location by comparing the selected corresponding behavior characteristic information with the time series variation in the currently obtained travel condition information of the vehicle; and outputting a prediction result based upon the predicted vehicle behavior of the vehicle to a driving assist control unit configured to perform driving assist based upon the prediction result,
wherein predicting the vehicle behavior of the vehicle includes predicting, as the vehicle behavior, one of occurrence of deceleration behavior and occurrence of acceleration behavior by the vehicle in the predetermined location.

11. A vehicle behavior prediction apparatus comprising:
a storage device that stores a plurality of pieces of behavior characteristic information that is information associating a vehicle behavior of a vehicle with a characteristic of time series variation in travel condition information, the plurality of pieces of the behavior characteristic information being divided into a plurality of patterns corresponding to different traffic conditions in a preceding location preceding a predetermined location;
acquisition circuitry configured to obtain travel condition information of the vehicle;
selection circuitry configured to select, as corresponding behavior characteristic information, behavior characteristic information having a pattern that corresponds to a current traffic condition from among the plurality of pieces of the behavior characteristic information stored in the storage device on the basis of the travel condition information obtained by the acquisition circuitry upon arrival of the vehicle in the preceding location; and
prediction circuitry configured to:
    predict vehicle behavior of the vehicle in the predetermined location by comparing the corresponding behavior characteristic information selected by the selection circuitry with the time series variation in the travel condition information of the vehicle currently obtained by the acquisition circuitry, and
    output a prediction result based upon the predicted vehicle behavior of the vehicle to driving assist control circuitry configured to perform driving assist based upon the prediction result, wherein:
the behavior characteristic information is created for each travel location; and
the prediction circuitry is configured to identify the travel location of the vehicle and compare the corresponding behavior characteristic information created in a location corresponding to the identified travel location with the time series variation in the travel condition information.

12. The vehicle behavior prediction apparatus according to claim 11, wherein:
the behavior characteristic information is created for each travel environment; and
when the corresponding behavior characteristic information created in the location corresponding to the identified travel location is not stored in the storage device, the prediction circuitry is configured to compare the corresponding behavior characteristic information created in a similar travel environment to the travel environment of the vehicle with the time series variation in the travel condition information.

13. A vehicle behavior prediction method comprising:
storing a plurality of pieces of behavior characteristic information that is information associating a vehicle behavior of a vehicle with a characteristic of time series variation in travel condition information, in a storage device, the plurality of pieces of the behavior characteristic information being divided into a plurality of patterns corresponding to different traffic conditions in a preceding location preceding a predetermined location;
obtaining travel condition information of the vehicle;
selecting, as corresponding behavior characteristic information, behavior characteristic information having a pattern that corresponds to a current traffic condition from among the plurality of pieces of the behavior characteristic information stored in the storage device on the basis of the travel condition information obtained upon arrival of the vehicle in the preceding location;
predicting vehicle behavior of the vehicle in the predetermined location by comparing the selected corresponding behavior characteristic information with the time series variation in the currently obtained travel condition information of the vehicle; and
outputting a prediction result based upon the predicted vehicle behavior of the vehicle to a driving assist control unit configured to perform driving assist based upon the prediction result, wherein:
the behavior characteristic information is created for each travel location; and
the predicting the vehicle behavior of the vehicle includes identifying the travel location of the vehicle and comparing the corresponding behavior characteristic information created in a location corresponding to the identified travel location with the time series variation in the travel condition information.

* * * * *